(12) United States Patent
Wu et al.

(10) Patent No.: US 12,003,320 B2
(45) Date of Patent: Jun. 4, 2024

(54) INFORMATION TRANSMISSION METHOD WITH MAPPING OF PBCH REFERENCE SIGNAL, INFORMATION RECEPTION METHOD, NETWORK SIDE DEVICE AND USER EQUIPMENT

(71) Applicant: VIVO MOBILE COMMUNICATION CO., LTD., Chang'an Dongguan (CN)

(72) Inventors: Kai Wu, Chang'an Dongguan (CN); Xiaodong Shen, Chang'an Dongguan (CN); Yu Ding, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 97 days.

(21) Appl. No.: 16/623,147

(22) PCT Filed: Jun. 11, 2018

(86) PCT No.: PCT/CN2018/090594
§ 371 (c)(1),
(2) Date: Dec. 16, 2019

(87) PCT Pub. No.: WO2018/228312
PCT Pub. Date: Dec. 20, 2018

(65) Prior Publication Data
US 2020/0187161 A1    Jun. 11, 2020

(30) Foreign Application Priority Data
Jun. 16, 2017    (CN) .......................... 201710459270.2

(51) Int. Cl.
*H04L 1/00*    (2006.01)
*H04L 5/00*    (2006.01)
(Continued)

(52) U.S. Cl.
CPC .......... *H04L 1/0027* (2013.01); *H04L 5/0048* (2013.01); *H04L 5/005* (2013.01);
(Continued)

(58) Field of Classification Search
CPC . H04W 72/005; H04W 48/10; H04W 56/001; H04L 5/005; H04L 25/0224
See application file for complete search history.

(56) References Cited

U.S. PATENT DOCUMENTS 11,223,370 B2 *   1/2022   Noh ...................... H04L 1/0067
2011/0026645 A1   2/2011   Luo et al.
(Continued)

FOREIGN PATENT DOCUMENTS

CN    101801014 A    8/2010
CN    102263580 A    11/2011
(Continued)

OTHER PUBLICATIONS

Chinese Office Action for related Chinese Application No. 201710459270.2; reported on Oct. 10, 2020.
(Continued)

*Primary Examiner* — Justin T Van Roie
(74) *Attorney, Agent, or Firm* — von Briesen & Roper, s.c.

(57) ABSTRACT

Provided are an information transmission method, an information reception method, a network side device and a UE. The information transmission method includes: mapping a first to-be-transmitted signal and a second to-be-transmitted signal to a first OFDM symbol and a second OFDM symbol in an SS block respectively, a phase difference between the first to-be-transmitted signal and the second to-be-transmitted signal representing target information; and transmitting the first to-be-transmitted signal, the second to-be-transmitted signal and parity information for checking the target
(Continued)

information through the SS block, and the parity information being carried by a PBCH.

17 Claims, 8 Drawing Sheets

(51) Int. Cl.
| | |
|---|---|
| *H04L 25/02* | (2006.01) |
| *H04L 27/26* | (2006.01) |
| *H04W 48/10* | (2009.01) |
| *H04W 56/00* | (2009.01) |
| *H04W 72/30* | (2023.01) |

(52) U.S. Cl.
CPC ...... *H04L 25/0224* (2013.01); *H04L 27/2613* (2013.01); *H04W 48/10* (2013.01); *H04W 56/001* (2013.01); *H04W 72/30* (2023.01); *H04L 27/26136* (2021.01)

(56) References Cited

U.S. PATENT DOCUMENTS

| | | | |
|---|---|---|---|
| 2012/0120882 A1 | 5/2012 | Luo et al. | |
| 2013/0076566 A1 | 3/2013 | Jiang et al. | |
| 2014/0169328 A1 | 6/2014 | Ahimezawa et al. | |
| 2014/0301296 A1 | 10/2014 | Vos et al. | |
| 2015/0124736 A1 | 5/2015 | Ko et al. | |
| 2018/0227867 A1* | 8/2018 | Park | H04L 5/005 |
| 2019/0319745 A1* | 10/2019 | Pan | H04L 69/324 |
| 2020/0067640 A1* | 2/2020 | Hui | H04L 1/0047 |
| 2020/0187159 A1* | 6/2020 | Ko | H04J 11/0079 |
| 2020/0228236 A1* | 7/2020 | Xi | H04L 1/0041 |
| 2021/0176739 A1* | 6/2021 | Hui | H04L 1/0076 |

FOREIGN PATENT DOCUMENTS

| | | |
|---|---|---|
| CN | 102474387 A | 5/2012 |
| CN | 102907035 A | 1/2013 |
| CN | 103067327 A | 4/2013 |
| CN | 103326838 A | 9/2013 |
| CN | 103944699 A | 7/2014 |
| CN | 104104466 A | 10/2014 |
| CN | 104396160 A | 3/2015 |

OTHER PUBLICATIONS

Chinese Office Action Application No. 201710459270.2; reported on Mar. 16, 2020.
Chinese Search Report Application No. 201710459270.2; reported on Apr. 16, 2019.
European Search Report Application No. 18818251.3; reported on May 28, 2020.
International Search Report & Written Opinion related to Application No. PCT/CN2018/090594; reported on Aug. 29, 2018.
Vivo; "Discussion on SS block time index indication"; 3GPP TSG RAN WG1 Meeting #89, R1-1707227, Hangzhou, P.R. China, May 15-19, 2017.
Vivo; "SS burst set composition and SS time index indication"; 3GPP TSG RAN WG1 Meeting #88bis, R1-1704486, Spokane, USA Apr. 3-7, 2017.
Fujitsu: "NR-PBCH design", 3GPP TSG RAN WG1 Meeting #89, R1-1707253, Hangzhou, China Apr. 15-19, 2017.
MediaTek Inc.: "Channel Coding for NR-PBCH", 3GPP TSG RAN WG1 RAN1 #89 Meeting, R1-1707846, Hangzhou, China, May 15-19, 2017.
Intel Corporation; Discussion on SCH, PBCH and PRACH enhancement for eMTC, 3GPP TSG RAN WG1 Meeting #78bis, R1-143773, Ljubljana, Slovenia, Oct. 6-10, 2014.

* cited by examiner

INFORMATION TRANSMISSION METHOD WITH MAPPING OF PBCH REFERENCE SIGNAL, INFORMATION RECEPTION METHOD, NETWORK SIDE DEVICE AND USER EQUIPMENT

CROSS-REFERENCE TO RELATED APPLICATION

This patent application is a 35 USC § 371 U.S. national stage of International Application No. PCT/CN2018/090594 filed on Jun. 11, 2018, which claims a priority of the Chinese Patent Application No. 201710459270.2 filed in China on Jun. 16, 2017, which are incorporated herein by reference in their entireties.

TECHNICAL FIELD

The present disclosure relates to the field of communication technology, in particular to an information transmission method, an information reception method, a network side device and a User Equipment (UE).

BACKGROUND

For a $5^{th}$-Generation (5G) mobile communication system, also called as New Radio (NR) system, its broadcast channel is different from that of a Long Term Evolution (LTE) system. Apart from transmitting partial minimum system information, it is necessary for a Physical Broadcast Channel (PBCH) of the NR system to indicate a time index of a Synchronization Signal (SS) block for a currently-transmitted NR-PBCH to a User Equipment (UE). There are at most 64 possible situations for the time index, i.e., it is necessary to transmit 6-bit information at most.

Currently, the time index and the partial minimum system information are carried in the NR-PBCH, so as to subject the time index and the partial minimum system information to a channel encoding process, and transmit the time index and the partial minimum system information. However, when the time index is transmitted in this manner, there is the following defect. Upon the receipt of the NR-PBCH, the UE needs to detect and decode the NR-PBCH after receiving the NR-PBCH, so as to acquire the timer index, so the entire procedure is relatively complex.

SUMMARY

An object of the present disclosure is to provide an information transmission method, an information reception method, a network side device and a UE, so as to solve the above problem.

In a first aspect, the present disclosure provides in some embodiments an information transmission method, including: mapping a PBCH reference signal to a symbol of an SS block through which a PBCH is to be transmitted, target information being transmitted through a sequence of the PBCH reference signal; and transmitting the PBCH reference signal and parity information for checking the target information through the SS block, the parity information being carried by the PBCH.

In a second aspect, the present disclosure provides in some embodiments an information reception method, including: performing reception detection on an SS block, to acquire a first transmission signal mapped to a first Orthogonal Frequency Division Multiplexing (OFDM) symbol, a second transmission signal mapped to a second OFDM symbol, and parity information carried by a PBCH; performing channel estimation on the first transmission signal and the second transmission signal, to acquire a phase difference between the first transmission signal and the second transmission signal; acquiring to-be-checked target information in accordance with the phase difference; and checking the to-be-checked target information in accordance with the parity information.

In a third aspect, the present disclosure provides in some embodiments a network side device, including: a mapping module configured to map a PBCH reference signal to a symbol of an SS block through which a PBCH is to be transmitted, target information being transmitted through a sequence of the PBCH reference signal; and a transmission module configured to transmit the PBCH reference signal and parity information for checking the target information through the SS block, the parity information being carried by the PBCH.

In a fourth aspect, the present disclosure provides in some embodiments a UE, including: a first acquisition module configured to perform reception detection on an SS block, to acquire a first transmission signal mapped to a first OFDM symbol, a second transmission signal mapped to a second OFDM symbol, and parity information carried by a PBCH; a second acquisition module configured to perform channel estimation on the first transmission signal and the second transmission signal, to acquire a phase difference between the first transmission signal and the second transmission signal; a third acquisition module configured to acquire to-be-checked target information in accordance with the phase difference; and a checking module configured to check the to-be-checked target information in accordance with the parity information.

In a fifth aspect, the present disclosure provides in some embodiments a network side device, including a processor, a memory and an information transmission program stored in the memory and capable of being executed by the processor. The processor is configured to execute the information transmission program to implement the above-mentioned information transmission method.

In a sixth aspect, the present disclosure provides in some embodiments a UE device, including a processor, a memory and an information reception program stored in the memory and capable of being executed by the processor. The processor is configured to execute the information reception program to implement the above-mentioned information transmission method.

In a seventh aspect, the present disclosure provides in some embodiments a computer-readable storage medium storing therein a computer program. The computer program is capable of being executed by a processor to implement the above information transmission method or the above information reception method.

In an eighth aspect, the present disclosure provides in some embodiments a computer-readable storage medium storing therein an information reception program. The computer program is capable of being executed by a processor to implement the above information reception method.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In the following, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
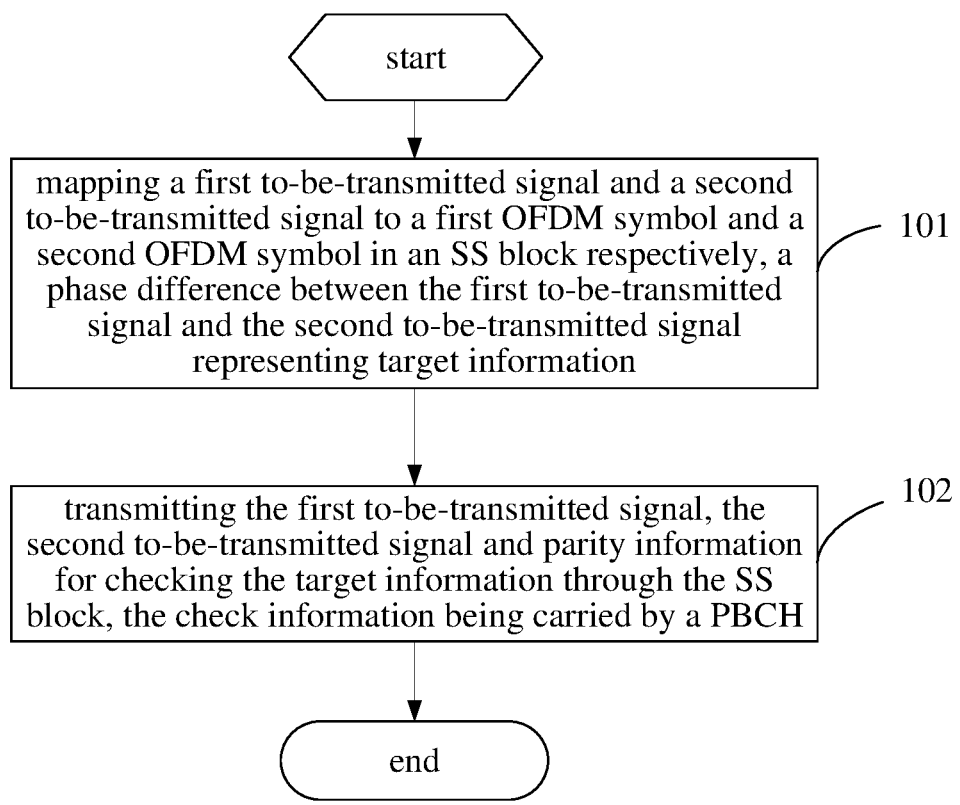
FIG. 1 is a flow chart of an information transmission method according to an embodiment of the present disclosure.

As shown in FIG. 1 being a flow chart of an information transmission method according to an embodiment of the present disclosure, the present disclosure provides in some embodiments an information transmission method for a network side device including the following steps.

Step 101: mapping a first to-be-transmitted signal and a second to-be-transmitted signal to a first OFDM symbol and a second OFDM symbol in an SS block respectively, a phase difference between the first to-be-transmitted signal and the second to-be-transmitted signal representing target information.

During the embodiment of the present disclosure, the SS block may be processed subsequently as a whole. Alternatively, the SS block may also be divided into at least two resource groups in a frequency domain, and the target information may be transmitted in a part of or all of the resource groups.

In a grouping mode, the network side device may divide the SS block into at least two resource groups in the frequency domain in advance, and the first to-be-transmitted signal and the second to-be-transmitted signal may be mapped on the first OFDM symbol and the second OFDM symbol in each resource group of the SS block respectively. In addition, after the SS block has been divided into the resource groups, to-be-transmitted reference signals may also be divided into groups, so as to transmit different reference signals through different resource groups.

Further, the first to-be-transmitted signal and the second to-be-transmitted signal may be mapped to a predetermined Resource Element (RE) of the first OFDM symbol and a predetermined RE of the second OFDM symbol respectively. Each resource group may include at least a set of 12 consecutive subcarriers, i.e., the number of the subcarriers in each resource group may be an integral multiple of 12. In addition, all the subcarriers in each resource group may be consecutive, or the resource group may include a plurality of subsets each consisting of 12 consecutive subcarriers. For example, each resource group may include 36 subcarriers, i.e., subcarriers 1-36, or three consecutive subsets of subcarriers 1-12, subcarriers 24-36 and subcarriers 48-60, which will not be particularly defined herein.

In a possible embodiment of the present disclosure, each of the first to-be-transmitted signal and the second to-be-transmitted signal may be, but not limited to, a reference signal or data. The phase difference between the first to-be-transmitted signal and the second to-be-transmitted signal may be used to represent the target information. The phase difference between the first to-be-transmitted signal and the second to-be-transmitted signal may be acquired through phase rotation. For ease of understanding, the phase difference between the first to-be-transmitted signal and the second to-be-transmitted signal may be acquired in, but not limited to, the following two modes.

In a first mode, at least one of the first to-be-transmitted signal and the second to-be-transmitted signal may be subjected to phase rotation, so as to enable the phase difference between the first to-be-transmitted signal and the second to-be-transmitted signal acquired after the phase rotation to correspond to a bit value of the target information. Then, the two to-be-transmitted signals after the phase rotation may be mapped to the predetermined RE of the first OFDM symbol and the predetermined RE of the second OFDM symbol respectively.

In a second mode, the first to-be-transmitted signal and the second to-be-transmitted signal may be mapped to the predetermined RE of the first OFDM symbol and the predetermined RE of the second OFDM symbol respectively, and then at least one of the first OFDM symbol and the second OFDM symbol may be subjected to phase rotation, so as to enable the phase difference between the first to-be-transmitted signal and the second to-be-transmitted signal acquired after the phase rotation to correspond to the bit value of the target information.

The phase difference between the first to-be-transmitted signal and the second to-be-transmitted signal may carry information having one or at least two bits, so as to represent the target information. The number of the bits may be pre-defined, and different phase differences may represent different bit values. In addition, a specific value of the phase difference may be determined according to the practical need.

For example, the phase difference between the first to-be-transmitted signal and the second to-be-transmitted signal carries the information having one bit. When the phase difference between the first to-be-transmitted signal and the second to-be-transmitted signal is 0, the phase different may represent an information bit 0, and when the phase difference between the first to-be-transmitted signal and the second to-be-transmitted signal is π, the phase difference may represent an information bit 1. Alternatively, when the phase difference between the first to-be-transmitted signal and the second to-be-transmitted signal is π, the phase difference may represent an information bit 0, and when the phase difference between the first to-be-transmitted signal and the second to-be-transmitted signal is 0, the phase difference may represent an information bit 1.

For example, the phase difference between the first to-be-transmitted signal and the second to-be-transmitted signal represents information having two bits. When the phase difference between the first to-be-transmitted signal and the second to-be-transmitted signal belongs to a set $\{0, \pi/2, \pi/3, \pi/2\}$, the bits represented by the phase difference may belong to a set $\{00, 01, 11, 10\}$, and the phase differences may correspond to the bits respectively. For example, when the phase difference between the first to-be-transmitted signal and the second to-be-transmitted signal is 0, the phase difference may represent an information bit 00; when the phase difference between two groups of reference signals is $\pi/2$, the phase difference may represent an information bit 01; when the phase difference between the information is $\pi$, the phase difference may represent an information bit 11; and when the phase difference between the information is $3\pi/2$, the phase difference may represent an information bit 10. It should be appreciated that, in some other embodiments of the present disclosure, when the phase difference between the first to-be-transmitted signal and the second to-be-transmitted signal is 0, the phase difference may also represent any one of the information bits 01, 10 and 11, and when the phase difference has another value, it may represent another information bit.

During the implementation, the SS block may include four OFDM symbols arranged consecutively in a time domain, i.e., one OFDM symbol for transmitting a Primary Synchronization Signal (PSS), one OFDM symbol for transmitting a Secondary Synchronization Signal (SSS), and two OFDM symbols for transmitting a PBCH. In a possible embodiment of the present disclosure, when each of the first to-be-transmitted signal and the second to-be-transmitted signal is a reference signal, the first OFDM symbol and the second OFDM symbol may be both used to transmit the PBCH. However, the present disclosure may not be limited thereto.

In this step, parity information for checking the target information may also be transmitted through the SS block. At this time, an error detection function may be introduced, so as to enable a UE, during an initial access process, detect whether information carried in a received first transmission signal and a received second transmission signal is correct, thereby to improve the reliability of the information acquired by the UE. The parity information for checking the target information may be acquired in various modes as described below.

Mode 1: in a possible embodiment of the present disclosure, the parity information may be information acquired through encoding first concatenate information. The first concatenate information may be information acquired after concatenating combination information and first parity information corresponding to the combination information. The combination information may be information acquired after combining partial minimum system information and the target information.

The parity information may be generated as follows (for ease of understanding, the partial minimum system information may be marked as bit A, and the target information may be marked as bit B).

Step 1: the network side device may combine the partial minimum system information and the target information, i.e., combine the bit A and the bit B, in a predefined manner, so as to acquire the combination information marked as bit (A+B).

Step 2: the network side device may generate the first parity information corresponding to the combination information in accordance with a predetermined checking mode, and the first parity information corresponding to the combination information is marked as bit C. The checking mode may be, but not limited to, Cyclic Redundancy Check (CRC), parity check, or Hamming code check.

Step 3: the network side device may concatenate the combination information and the first parity information corresponding to the combination information, i.e., concatenate bit (A+B) and bit C, so as to acquire the first concatenate information marked as $\{(A+B)+C\}$.

Step 4: the network side device may encode the first concatenate information, i.e., bit $\{(A+B)+C\}$, so as to acquire the parity information.

A specific encoding mode may include, but not limited to, a Polar encoding mode.

Through the above steps, the acquired parity information may include the target information. Hence, when the UE has detected the parity information and directly checked the parity information through the CRC and a checking result is positive, to-be-checked target information carried in the first transmission information and the second transmission information received by the UE may be checked using the target information in the parity information. At this time, when a checking result is positive, it means that the to-be-checked target information carried in the first transmission information and the second transmission information is correct. As a result, it is able to improve the reliability of the information received by the UE.

Mode 2: in a possible embodiment of the present disclosure, the parity information may be information acquired through encoding second concatenate information. The second concatenate information may be information acquired after concatenating the partial minimum system information and the first parity information corresponding to combination information. The combination information may be information acquired after combining the partial minimum system information and the target information.

The parity information may be generated as follows (for ease of understanding, the partial minimum system information may be marked as bit A, and the target information may be marked as bit B).

Step 1: the network side device may combine the partial minimum system information and the target information, i.e., combine the bit A and the bit B, in a predefined manner, so as to acquire the combination information marked as bit (A+B).

Step 2: the network side device may generate the first parity information corresponding to the combination information (i.e., the first parity information corresponding to bit (A+B)) in accordance with a predetermined checking mode, and the first parity information corresponding to bit (A+B) is marked as bit C. The checking mode may be, but not limited to, CRC, parity check, or Hamming code check.

Step 3: the network side device may concatenate the partial minimum system information and the first parity information corresponding to the combination information, i.e., concatenate bit A and bit C, so as to acquire the second concatenate information, marked as bit (A+C).

Step 4: the network side device may encode the second concatenate information, i.e., bit (A+C), in a polar encoding manner, so as to acquire the parity information.

Through the above steps, although the acquired parity information does not include the target information, the first parity information corresponding to the combination information for the parity information may be generated in accordance with the target information. Hence, when the UE has detected the parity information, the UE may combine the parity information and the to-be-checked target information carried in the first transmission signal and the second transmission signal received by the UE, and check the combination information through CRC. At this time, when a checking result is positive, it means that the to-be-checked target information carried in the first transmission information and the second transmission information received by the UE is consistent with the target information, and the to-be-checked target information carried in the first transmission information and the second transmission information received by the UE is correct. As a result, it is able to improve the reliability of the information received by the UE.

It should be appreciated that, no bit B is carried in Mode 2, so it is able to improve the resource utilization.

Mode 3: in a possible embodiment of the present disclosure, the parity information may be information acquired through encoding third concatenate information. The third concatenate information may be information acquired through concatenating the partial minimum system information and second parity information corresponding to the partial minimum system information. The second parity information may be information acquired through scrambling third parity information corresponding to the partial minimum system information by using a scrambling sequence corresponding to the target information.

In this embodiment, the parity information may be generated as follows (for ease of understanding, the partial minimum system information may be marked as bit A, and the target information may be marked as bit B).

Step 1: the network side device may generate the third parity information corresponding to the partial minimum system information, i.e., the third parity information corresponding to bit A and being marked as bit D, in accordance with a predetermined checking mode. The checking mode may be, but not limited to, CRC, parity check, or Hamming code check.

Step 2: the network side device may scramble the third parity information corresponding to the partial minimum system information, i.e., bit D, using the scrambling sequence corresponding to the target information, i.e., the scrambling sequence corresponding to bit B, so as to acquire the second parity information corresponding to the partial minimum system information. The second parity information corresponding to the partial minimum system information is marked bit E A tail bit sequence of the scrambling sequence may be the same as bit B. When the scrambling sequence has a length of 16 bits, a mapping relationship between the scrambling sequences and bit B may be shown in Table 1.

TABLE 1 mapping relationship between scrambling sequences and bit B

| Bit B | Scrambling sequence |
|---|---|
| 00 | <0, 0, 0, 0, 0, 0, 0, 0, 0, 0, 0, 0> |
| 01 | <0, 0, 0, 0, 0, 0, 0, 0, 0, 0, 0, 1> |
| 10 | <0, 0, 0, 0, 0, 0, 0, 0, 0, 0, 1, 0> |
| 11 | <0, 0, 0, 0, 0, 0, 0, 0, 0, 0, 1, 1> |

Step 3: the network side device may concatenate the partial minimum system information, i.e., bit A, and the second parity information corresponding to the partial minimum system information, i.e., bit E, so as to acquire the third concatenate information. The third concatenate information is marked as bit (A+E).

Step 4: the network side device may encode the third concatenate information, i.e., bit (A+E), in a polar encoding manner, so as to acquire the parity information.

Through the above steps, although the acquired parity information does not include the target information, the second parity information corresponding to the partial minimum system information for the parity information may be generated in accordance with the scrambling sequence corresponding to the target information. Hence, when the UE has detected the parity information, the UE may descramble the second parity information corresponding to the partial minimum system information in the parity information using the scrambling sequence corresponding to the to-be-checked target information carried in the first transmission information and the second transmission information received by the UE, and check the descrambled second parity information corresponding to the partial minimum system information. At this time, when a checking result is positive, it means that the to-be-checked target information carried in the first transmission information and the second transmission information received by the UE is consistent with the target information, and the to-be-checked target information carried in the first transmission information and the second transmission information received by the UE is correct. As a result, it is able to improve the reliability of the information received by the UE.

It should be appreciated that, after the UE has detected the parity information, the UE may also descramble the second parity information corresponding to the partial minimum system information in the parity information in a blind-matching manner, and check the descrambled second parity information corresponding to the partial minimum system information. When the checking result is positive, it means that the target information corresponding to the scrambling sequence used when the checking result is positive is consistent with the target information. At this time, the UE may further check the to-be-checked target information carried in the first transmission information and the second transmission information received by the UE using the target information corresponding to the scrambling sequence used when the checking result is positive. When a checking result is positive, it means that the to-be-checked target information carried in the first transmission information and the second transmission information received by the UE is consistent with the target information, and the to-be-checked target information carried in the first to-be-transmitted information and the second to-be-transmitted information received by the UE is correct. As a result, it is able to improve the reliability of the target information acquired by the UE.

It should be appreciated that, no bit B may be carried in Mode 3, so it is able to improve the resource utilization.

As mentioned above, the parity information may be, but not limited to, CRC information, parity check information or Hamming code check information.

In a possible embodiment of the present disclosure, the target information may include at least one of time index information of the SS block, time index information of a portion of the SS block, a high-order bit of the time index information of the SS block, transmission reception point identification information, a PBCH combination indication signal, a system frame number, an extended system frame number, an extended cell identity (ID), time-frequency position information of a common search space, idle reservation information, system bandwidth information, period indication information of an SS burst set, a transmission measurement period, a transmission measurement duration, a Physical Hybrid Automatic Repeat Request Indication Channel (PHICH), antenna configuration information, non-standalone/standalone (NSA/SA) indication information, and half-frame number indication information indicating whether Single Side Band (SSB) is located within a first half frame or a second half frame of a radio frame.

Step 102: transmitting the first to-be-transmitted signal, the second to-be-transmitted signal and the parity information for checking the target information through the SS block, the parity information being carried by the PBCH.

In this step, the first to-be-transmitted signal and the second to-be-transmitted signal may be carried on a PBCH symbol in the SS block, and the parity information may be carried in the PBCH. Hence, the network side device may transmit the first to-be-transmitted signal, the second to-be-transmitted signal and the parity information for checking the target information through the SS block to the UE, so as to enable the UE, during an initial access process, directly perform channel estimation through the first to-be-transmitted signal and the second to-be-transmitted signal mapped to the SS block, and acquire the target information without any additional decoding process of the UE, thereby to reduce the complexity in processing the information at the UE. In addition, the UE may also check the acquired target information in accordance with the received parity information, so as to improve the reliability of the target information acquired by the UE.

In the embodiments of the present disclosure, the information transmission method may be applied to an LTE system, a 5G system, or another newly-designed OFDM radio access system.

The network side device may be a base station in a Global System for Mobile Communication (GSM) or a Code Division Multiple Access (CDMA) system, a Node B (NB) in a Wideband Code Division Multiple Access (WCDMA) system, an evolved Node B (eNB or eNodeB) in an LTE system, a relay or access point, or a base station in a future 5G network, which will not be particularly defined herein.

The UE may be a wireless UE or a wired UE. The wireless UE may be a device capable of providing voice data and/or any other service data to a user, e.g., a handheld device having a wireless connection function, or another processing device capable of being connected to a wireless modem. The wireless UE may communicate with one or more core networks via a Radio Access Network (RAN). The wireless UE may be a terminal device, e.g., a mobile phone, a tablet personal computer, a laptop computer, a Personal Digital Assistant (PDA), a Mobile Internet Device (MID) or a wearable device. The wireless terminal may also be called as system, subscriber unit, subscriber station, mobile station, mobile, remote station, remote terminal, access terminal, user terminal, user agent or user device, which will not be particularly defined herein.

According to the information transmission method in the embodiments of the present disclosure, the first to-be-transmitted signal and the second to-be-transmitted signal may be mapped to the first OFDM symbol and the second OFDM symbol in the SS block, and the phase difference between the first to-be-transmitted signal and the second to-be-transmitted signal may represent the target information. Then, the first to-be-transmitted signal, the second to-be-transmitted signal and the parity information for checking the target information may be transmitted through the SS block, and the parity information may be carried by the PBCH. As a result, it is able for the UE to directly perform the channel estimation through the received first transmission signal and the received second transmission signal to acquire the target information without any additional decoding process of the UE, thereby to reduce the complexity in processing the information at the UE. In addition, the UE may further check the acquired target information in accordance with the received parity information, so it is able to improve the reliability of the target information acquired by the UE.

It should be appreciated that, in the embodiment of the present disclosure, the target information may be recorded through the phase difference as mentioned hereinabove, or in another way, e.g., a sequence used by the reference signal. For example, a reference signal generated using a sequence 1 may be used to represent the information bit 0, and a reference signal generated using a sequence 1 may be used to represent the information bit 1. It should be appreciated that, the more the sequences, the more the target information. The other possible ways will not be particularly defined herein.

Figure 2:
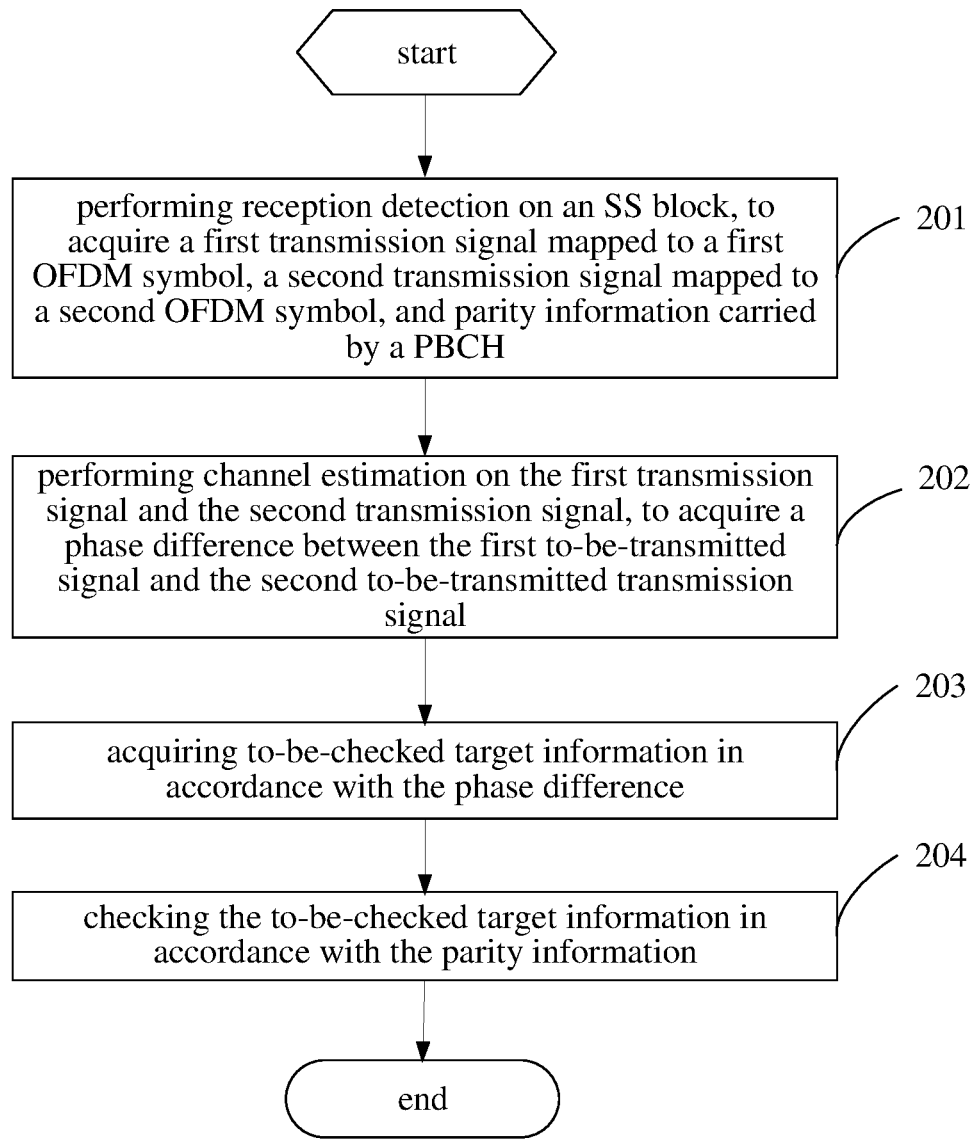
FIG. 2 is a flow chart of an information reception method according to an embodiment of the present disclosure.

As shown in FIG. 2 being a flow chart of an information reception method according to an embodiment of the present disclosure, the present disclosure further provides in some embodiments an information reception method for a UE including the following steps.

Step 201: performing reception detection on an SS block, so as to acquire a first transmission signal mapped to a first OFDM symbol, a second transmission signal mapped to a second OFDM symbol, and parity information carried by a PBCH.

In this step, the UE may perform the reception detection on a predetermined resource. In the embodiments of the present disclosure, upon the receipt of information transmitted by a network side device through the PBCH, the UE may acquire a PSS, an SSS and the PBCH from the SS block, detect the first transmission signal mapped to the first OFDM symbol of the SS block or a group of SS blocks and the second transmission signal mapped to the second OFDM symbol, and detect the parity information in the PBCH.

To be specific, when performing the reception detection on the resource in the predetermined SS block, the UE may acquire the first transmission signal on a predefined RE of the first OFDM symbol, and acquire the second transmission signal on a predefined RE of the second OFDM symbol.

In a possible embodiment of the present disclosure, the first transmission signal and the second transmission signal may each be a reference signal or data.

In a possible embodiment of the present disclosure, the first OFDM symbol and the second OFDM symbol may each be a symbol for transmitting the PBCH.

In a possible embodiment of the present disclosure, the parity information may be CRC information.

In a possible embodiment of the present disclosure, the target information may include at least one of time index information of the SS block, time index information of a portion of the SS block, a high-order bit of the time index information of the SS block, Transmission Reception Point (TRP) identification information, a PBCH combination indication signal, a system frame number, an extended system frame number, an extended cell ID, time-frequency position information of a common search space, idle reservation information, system bandwidth information, period indication information of an SS burst set, a transmission measurement period, a transmission measurement duration, a PHICH, antenna configuration information, and non-standalone/standalone (NSA/SA) indication information.

It should be appreciated that, the functions of the UE in the embodiments of the present disclosure may refer to corresponding information reception method as mentioned above. The description about the first transmission signal, the second transmission signal, the first OFDM symbol, the second OFDM symbol and the parity information may refer to that mentioned hereinabove and thus will not be particularly defined herein.

Step 202: performing channel estimation on the first transmission signal and the second transmission signal, so as to acquire a phase difference between the first transmission signal and the second transmission signal.

Step 203: acquiring to-be-checked target information in accordance with the phase difference.

In this step, the UE may directly perform the channel estimation on the acquired first transmission signal and second transmission signal, so as to acquire the phase difference between the first transmission signal and the second transmission signal. Then, the UE may determine information bit carried by the phase difference between the first transmission signal and the second transmission signal in accordance with a predetermined correspondence between phase differences and information bits, so as to acquire the to-be-checked target information without any additional decoding process of the UE. As a result, it is able to reduce the complexity in processing the information at the UE.

Step 204: checking the to-be-checked target information in accordance with the parity information.

In this step, the UE may check the to-be-checked target information in accordance with the acquired parity information, so as to determine whether the to-be-checked target information is the target information, thereby to improve the reliability of the to-be-checked target information. The to-be-checked target information may be checked in, but not limited to, the following modes, and a specific checking mode may be determined according to actual content contained in the parity information.

Mode 1: in a possible embodiment of the present disclosure, the parity information may be information acquired through encoding first concatenate information. The first concatenate information may be information acquired through concatenating combination information and first parity information corresponding to the combination information. The combination information may be information acquired through combining partial minimum system information and target information. The target information may be information acquired by the network side device in accordance with a first to-be-transmitted signal and a second to-be-transmitted signal mapped to the first OFDM symbol and the second OFDM symbol respectively.

The checking the to-be-checked target information in accordance with the parity information may include: checking the first concatenate information; and when a checking result is positive, checking the to-be-checked target information in accordance with the target information in the combination information.

To be specific, the first concatenate information may include the target information, so the UE may detect information acquired through encoding the first concatenate information and decode the information, so as to acquire the first concatenate information. Next, the UE may directly check the first concatenate information through CRC, and when a checking result is positive, the UE may determine that all bits in the first concatenate information have been received correctly. The first concatenate information may include bits for the target information, so the UE may determine that the bits for the target information have been received correctly. Then, the UE may check the to-be-checked target information in accordance with the target information through CRC, and when a checking result is positive, it means that bits for the to-be-checked target information have been received correctly, i.e., the information carried in the first transmission signal and the second transmission signal detected by the UE may be correct. As a result, it is able to improve the reliability of the to-be-checked target information.

In Mode 1, when the target information is a high-order bit of a time index of the SS block, the information transmitted through PBCH may include all information bits of the time index of the SS block.

Mode 2: in a possible embodiment of the present disclosure, the parity information may be information acquired through encoding second concatenate information. The second concatenate information may be information acquired through concatenating partial minimum system information and first parity information corresponding to combination information. The combination information may be information acquired through combining the partial minimum system information and the target information. The target information may be information acquired by the network side device in accordance with the first to-be-transmitted signal and the second to-be-transmitted signal mapped to the first OFDM symbol and the second OFDM symbol respectively.

The checking the to-be-checked target information in accordance with the parity information may include: combining the second concatenate information and the to-be-checked target information; and checking the combination information.

In this step, although the second concatenate information does not include the target information, the first parity information corresponding to the combination information in the second concatenate information may be generated in accordance with the target information. Hence, when the UE has detected the information acquired through encoding the second concatenate information and decode the information to acquire the second concatenate information, the UE may insert the to-be-checked target information into the second concatenate information in a predefined mode for CRC detection. When a checking result is positive, it means that all bits of the to-be-checked target information and the second concatenate information have been received correctly, and the bits of the to-be-checked target information have been received correctly, i.e., the information carried in the first transmission signal and the second transmission signal detected by the UE is correct. As a result, it is able to improve the reliability of the to-be-checked target information.

Mode 3: in a possible embodiment of the present disclosure, the parity information may be information acquired through encoding third concatenate information. The third concatenate information may be information acquired through concatenating the partial minimum system information and second parity information corresponding to the partial minimum system information. The second parity information may be information acquired through scrambling third parity information corresponding to the partial minimum system information by using a scrambling sequence corresponding to the target information. The target information may be information acquired by the network side device in accordance with the first to-be-transmitted signal and the second to-be-transmitted signal mapped to the first OFDM symbol and the second OFDM symbol respectively.

In Mode 2 and Mode 3, when the target information is a high-order bit of the time index of the SS block, the information transmitted through PBCH may include information bits of the time index of the SS block other than the high-order bit of the time index of the SS block.

The checking the to-be-checked target information in accordance with the parity information may include: determining a scrambling sequence corresponding to the to-be-checked target information; descrambling the third parity information in the third concatenate information by using the scrambling sequence corresponding to the to-be-checked target information; and checking the descrambled third concatenate information.

In this step, although the third concatenate information does not include the target information, the second parity information corresponding to the partial minimum system information in the third concatenate information may be generated in accordance with the scrambling sequence corresponding to the target information. Hence, when the UE has detected the information acquired through encoding the third concatenate information and decode the information to acquire the third concatenate information, the UE may descramble the third parity information in the third concatenate information, and check the descrambled third concatenate information.

To be specific, for ease of understanding, for example, when the scrambling sequence corresponding to the to-be-checked target information is <0, 0, 0, 0, 0, 0, 0, 0, 0, 0, 0, 0, 0, 0, 0, 1>, the UE may descramble the third parity information in the third concatenate information by using the scrambling sequence, and check the descrambled third concatenate information through CRC. When a checking result is positive, it means that the bits of the to-be-checked target information are consistent with the bits of the target information and the bits of the to-be-checked target information have been received correctly, i.e., the information carried in the first transmission signal and the second transmission signal detected by the UE is correct. As a result, it is able to improve the reliability of the to-be-checked target information.

In a possible embodiment of the present disclosure, the parity information may be information acquired through encoding the third concatenate information. The third concatenate information may be information acquired through concatenating the partial minimum system information and the second parity information corresponding to the partial minimum system information. The second parity information may be information acquired through scrambling the third parity information corresponding to the partial minimum system information using the scrambling sequence corresponding to the target information. The target information may be information acquired by the network side device in accordance with the first to-be-transmitted signal and the second to-be-transmitted signal mapped to the first OFDM symbol and the second OFDM symbol respectively.

The checking the to-be-checked target information in accordance with the parity information may include: descrambling the third parity information in the third concatenate information by using the scrambling sequence; checking the descrambled third concatenate information; and checking the to-be-checked target information in accordance with the target information corresponding to the scrambling sequence used when a checking result is positive.

In this step, when the UE has detected the information acquired through encoding the third concatenate information, the UE may decode the information to acquire the third concatenate information, descramble the third parity information in the third concatenate information, check the descrambled third concatenate information, and check the to-be-checked target information in accordance with the target information corresponding to the scrambling sequence used when the checking result is positive.

To be specific, the UE may try to descramble the third parity information in the third concatenate information using various scrambling sequences, and check a plurality of pieces of descrambled third concatenate information through CRC. When a checking result of a certain piece of descrambled third concatenate information is positive, it means that the target information corresponding to the scrambling sequence used when the checking result of the descrambled third concatenate information is positive is consistent with the target information. Hence, the UE may check through CRC the to-be-checked target information in accordance with the target information corresponding to the scrambling sequence used when the checking result is positive, and when a checking result is positive, it means that the bits of the to-be-checked target information have been received correctly, i.e., the information carried in the first to-be-transmitted signal and the second to-be-transmitted signal received by the UE is correct. As a result, it is able to improve the reliability of the to-be-checked target information.

According to the information reception method in the embodiments of the present disclosure, the UE may perform reception detection on the SS block to acquire the first transmission signal mapped to the first OFDM symbol, the second transmission signal mapped to the second OFDM symbol and the parity information carried by the PBCH. Next, the UE may perform channel estimation on the first transmission signal and the second transmission signal to acquire the phase difference between the first transmission signal and the second transmission signal. Then, the UE may acquire the to-be-checked target information in accordance with the phase difference, and check the to-be-checked target information in accordance with the parity information. As a result, it is able for the UE to directly perform the channel estimation through the received first transmission signal and second transmission signal to acquire the to-be-checked target information without any additional decoding process of the UE, thereby to reduce the complexity in processing the information at the UE. In addition, the UE may further check the to-be-checked target information in accordance with the received parity information, so as to improve the reliability of the to-be-checked target information.

The information transmission method and the information reception method will be described hereinafter in more details.

In actual use, the network sided device may enable or disable a phase rotation function for an NR-PBCH to-be-transmitted signal. When a phase rotation for the to-be-transmitted signal is configured by the network side device as 0, it means that a pilot phase rotation function has been disabled. At this time, a certain combination of bit sequences carried in the phase rotation, e.g., a sequence consisting of 0s or 1s, may be predefined so as to implicitly indicate that the phase rotation function has been disabled. When the UE has detected the combination of the bit information sequences carried in the phase rotation for the NR-PBCH to-be-transmitted signal, it means that no phase rotation has been introduced at the network side device. When the network side device has enabled the phase rotation function for the NR-PBCH to-be-transmitted signal, the information may be transmitted as follows.

The SS blocks may be divided into groups so as to transmit more information. For example, the NR-PBCH to-be-transmitted signals are mapped to two of four OFDM symbols in each SS block. The NR SS blocks may be divided into eight resource groups, and each resource group may occupy 36 consecutive subcarriers or 3 groups each having 12 consecutive subcarriers.

Figure 3:
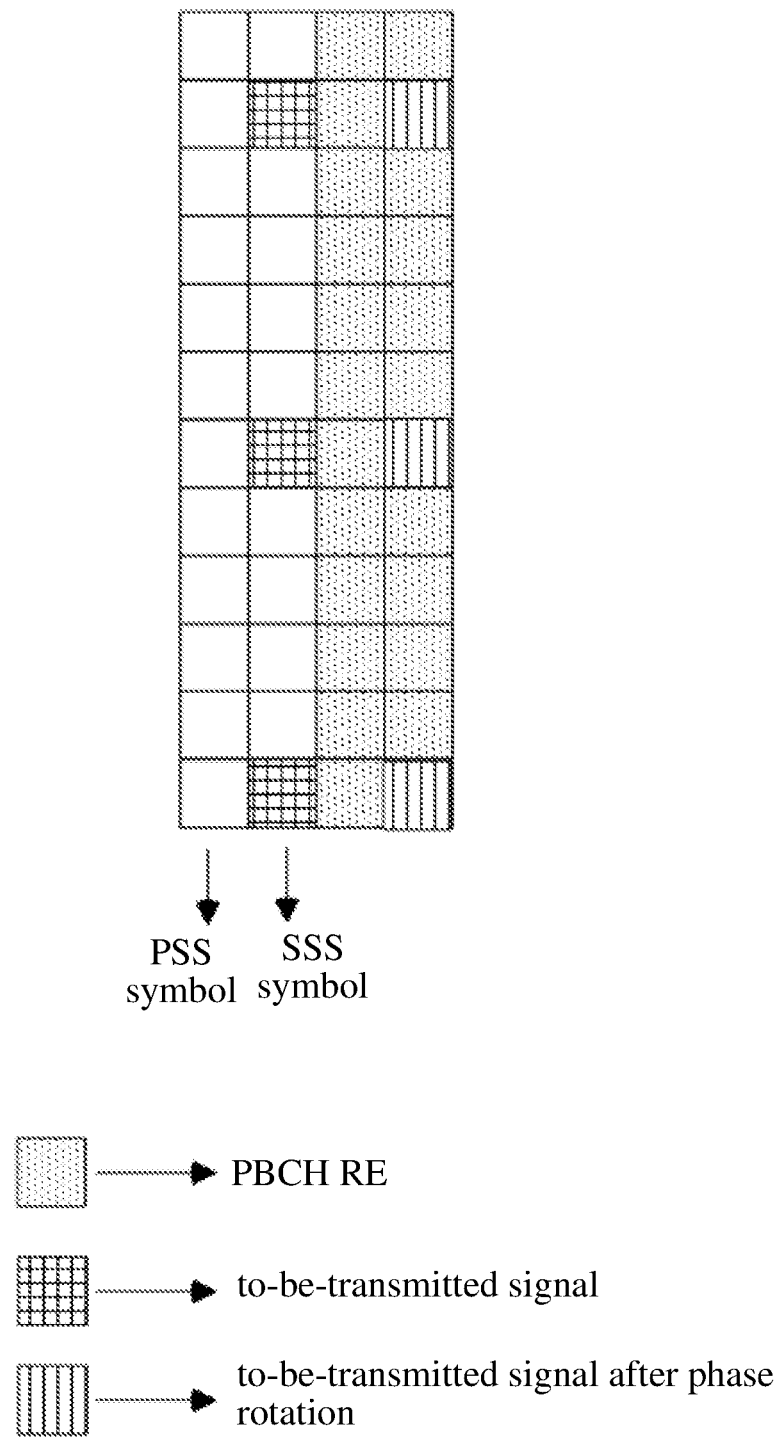
FIG. 3 is a schematic view showing a mapping relationship of a to-be-transmitted signal according to an embodiment of the present disclosure.

FIG. 3 shows a mapping relationship of the to-be-transmitted signal according to the embodiments of the present disclosure. As shown in FIG. 3, one of the two OFDM symbols to which the NR-PBCH to-be-transmitted signals are mapped may include a symbol for transmitting the SSS and a symbol for transmitting the PBCH. To be specific, the first to-be-transmitted signal and the second to-be-transmitted signal may be mapped to the symbol for transmitting the SSS and the symbol for transmitting the PBCH in the SS block respectively, and the phase rotation may be introduced into the NR-PBCH to-be-transmitted signal on one OFDM symbol. When the NR-PBCH to-be-transmitted signals are mapped to the OFDM symbol for transmitting the NR-SSS, no phase rotation may be introduced into these symbols of the to-be-transmitted signals, i.e., a phase rotation value may be 0. When the NR-PBCH to-be-transmitted signals are mapped to one of the two OFDM symbols for the NR-PBCH, the phase rotation may be introduced into these symbols of the to-be-transmitted signals. There may exist the following modes.

In a first mode, the phase rotation value (i.e., the phase difference) may be 0 or $\pi$. The phase rotation value 0 represents that a bit 0/1 is to be transmitted, and the phase rotation value $\pi$ represents that a bit 1/0 is to be transmitted. In this mode, information including one bit may be transmitted in the case that the NR SS blocks are not divided into groups. When the NR SS blocks are divided into groups, information including one bit may be transmitted through each NR SS block resource group, and information including eight bits may be transmitted through eight NR SS block resource groups.

In a second mode, the phase rotation value (i.e., the phase difference) may be 0, $\pi/2$, $\pi$ or $3\pi/2$. The phase rotation value 0 represents that bits 00 are to be transmitted, the phase rotation value $\pi/2$ represents that bits 01 are to be transmitted, the phase rotation value $\pi$ represents that bits 11 are to be transmitted, and the phase rotation value $3\pi/2$ represents that bits 10 are to be transmitted. In this mode, information including two bits may be transmitted in the case that the NR SS blocks are not divided into groups. When the NR SS blocks are divided into groups, information including two bits may be transmitted through each NR SS block resource group, and information including sixteen bits may be transmitted through eight NR SS block resource groups.

Figure 4:
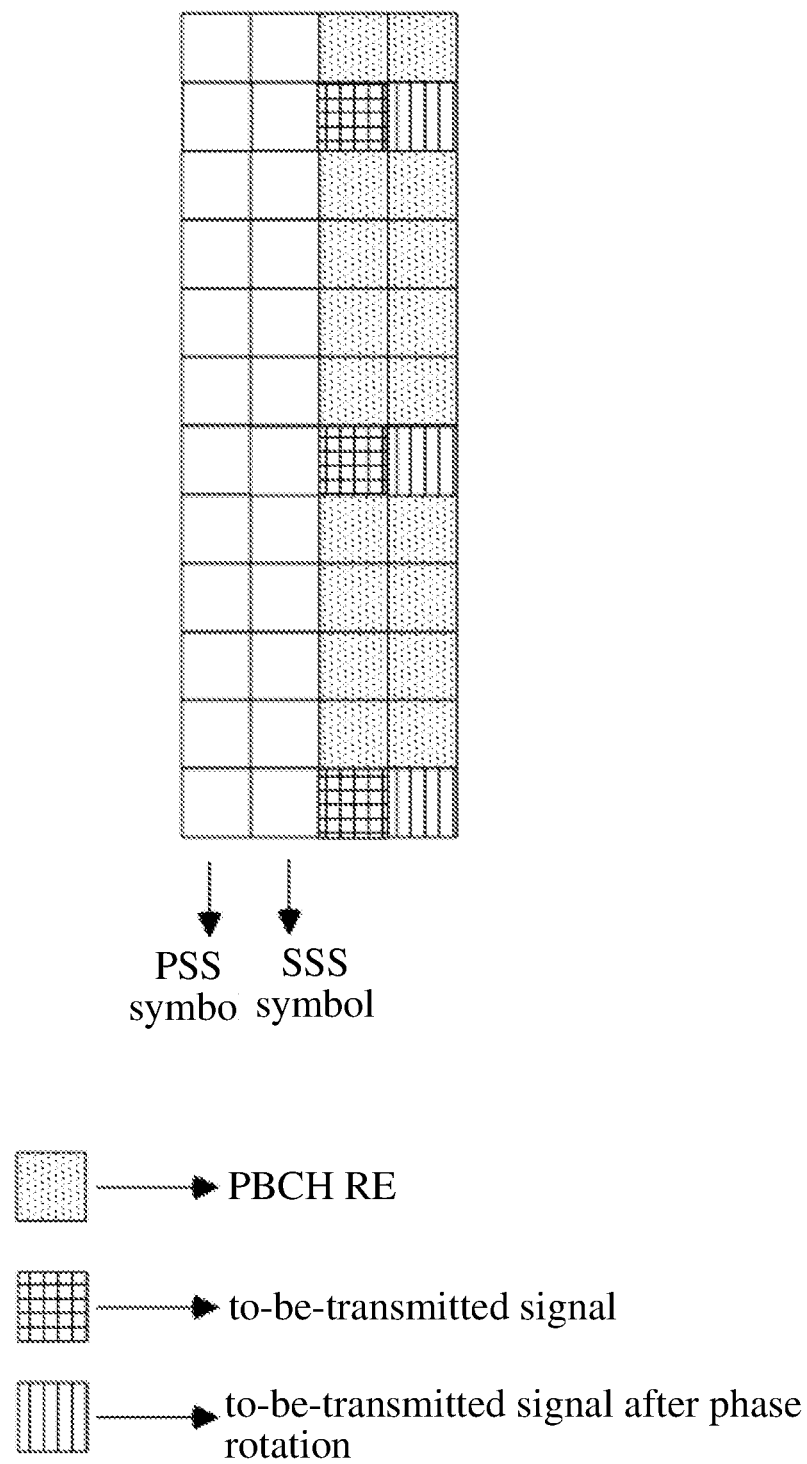
FIG. 4 is a schematic view showing another mapping relationship of the to-be-transmitted signal according to an embodiment of the present disclosure.

FIG. 4 shows a mapping relationship of another to-be-transmitted signal according to the embodiments of the present disclosure. As shown in FIG. 4, the NR-PBCH to-be-transmitted signals may be mapped to two OFDM symbols for the NR-PBCH, and the phase rotation may be introduced into parts of or all of the to-be-transmitted signals. There may exist at least the following modes.

In a first mode, the NR-PBCH to-be-transmitted signals may be mapped to the two OFDM symbols for the NR-PBCH. No phase rotation may be introduced into the symbol of the to-be-transmitted signal mapped to one OFDM symbol, and the phase rotation may be introduced into the symbol of the to-be-transmitted signal mapped to the other OFDM symbol, as shown in FIG. 4. The phase rotation value may be 0 or $\pi$. The phase rotation value 0 represents that a bit 0/1 is to be transmitted, and the phase rotation value $\pi$ represents that a bit 1/0 is to be transmitted. In this mode, information including one bit may be transmitted in the case that the NR SS blocks are not divided into groups. When the NR SS blocks are divided into groups, information including one bit may be transmitted through each NR SS block resource group, and information including eight bits may be transmitted through eight NR SS block resource groups.

Figure 5:
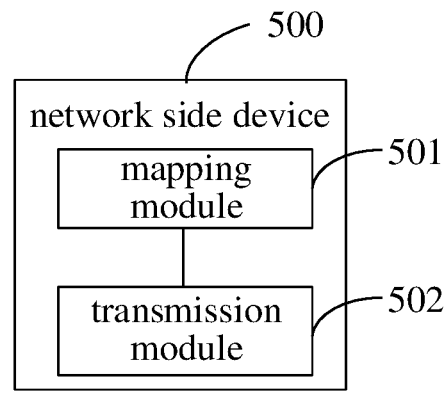
FIG. 5 is a schematic view showing a network side device according to an embodiment of the present disclosure.

In a second mode, no phase rotation may be introduced into the NR-PBCH to-be-transmitted signal mapped to one of the two OFDM symbols for the NR-PBCH, and the phase rotation may be introduced into the symbol of the to-be-transmitted signal mapped to the other OFDM symbol, as shown in FIG. 5. The phase rotation value may be 0, $\pi/2$, $\pi$ or $3\pi/2$. The phase rotation value 0 represents that bits 00 are to be transmitted, the phase rotation value $\pi/2$ represents that bits 01 are to be transmitted, the phase rotation value $\pi$ represents that bits 11 are to be transmitted, and the phase rotation value $3\pi/2$ represents that bits 10 are to be transmitted. In this mode, information including two bits may be transmitted in the case that the NR SS blocks are not divided into groups. When the NR SS blocks are divided into groups, information including two bits may be transmitted through each NR SS block resource group, and information including sixteen bits may be transmitted through eight NR SS block resource groups.

During the implementation, the network side device may transmit all OFDM symbols in the SS block. To be specific, the network side device may map the PBCH and the PBCH to-be-transmitted signal to a transmission unit of an antenna, and then transmit them through the antenna. The PBCH and the PBCH to-be-transmitted signal may be mapped to the transmission unit of the antenna using a predetermined precoding vector.

For example, for the eight resource groups, the NR-PBCH and the NR-PBCH to-be-transmitted signal may be mapped to the transmission unit of the antenna using a precoding vector. The precoding vector for each resource group may be selected from a precoding vector set cyclically, as shown in Table 2. Table 2 shows the precoding vector set mapped to two transmission units of the antennae. The NR-PBCH and the NR-PBCH to-be-transmitted signal may be mapped to the two transmission units using the precoding vectors corresponding to codebook identities 0, 1, 2, 3, 0, 1, 2, 3 for the eight resource groups respectively.

TABLE 2

| precoding vector set | |
|---|---|
| Codebook identity | Precoding vector |
| 0 | $\frac{1}{\sqrt{2}}\begin{bmatrix}1\\1\end{bmatrix}$ |
| 1 | $\frac{1}{\sqrt{2}}\begin{bmatrix}1\\-1\end{bmatrix}$ |

TABLE 2-continued precoding vector set

| Codebook identity | Precoding vector |
|---|---|
| 2 | $\frac{1}{\sqrt{2}}\begin{bmatrix}1\\j\end{bmatrix}$ |
| 3 | $\frac{1}{\sqrt{2}}\begin{bmatrix}1\\-j\end{bmatrix}$ |

In each resource group, for the two OFDM symbols to which the NR-PBCH to-be-transmitted signals are mapped, the phase rotation may be introduced into the NR-PBCH to-be-transmitted signal mapped to one of the OFDM symbols, as shown in FIGS. 4 and 5. Similar as those mentioned hereinabove, the phase rotation value may be 0 or π. The phase rotation value 0 represents that a bit 0 is to be transmitted, and the phase rotation value π represents that a bit 1 is to be transmitted. At this time, information including one bit and corresponding to each phase rotation value may be transmitted through each NR SS block resource group, and information including eight bits may be transmitted through eight NR SS block resource groups.

In a possible embodiment of the present disclosure, the phase rotation value may be 0, π/2, π or 3π/2. The phase rotation value 0 represents that bits 00 are to be transmitted, the phase rotation value π/2 represents that bits 01 are to be transmitted, the phase rotation value π represents that bits 11 are to be transmitted, and the phase rotation value 3π/2 represents that bits 10 are to be transmitted. At this time, information including two bits may be transmitted through each NR SS block resource group, and information including sixteen bits may be transmitted through eight NR SS block resource groups.

Based on the above, the network side device may transmit the information in accordance with the phase difference between the NR-PBCH to-be-transmitted signals. In actual use, the transmitted information may include, but not limited to, the time index information of the SS block, TRP identification information or other information, or a combination thereof. Some of the information carried in the to-be-transmitted signal will be described hereinafter.

(1) For the information carried in the NR-PBCH to-be-transmitted signal in the NR SS block, seven bits may be used to transmit the time index information of the SS block, or parts of the bits may be used to transmit a high-order bit of the time index information of the SS block.

(2) For the information carried in the NR-PBCH to-be-transmitted signal in the NR SS block, seven bits may be used to transmit the time index information of the SS block, and the remaining one bit may serve as a parity check bit for the seven-bit time index information of the SS block.

(3) For the information carried in the NR-PBCH to-be-transmitted signal in the NR SS block, one bit may be used to transmit combination indication information indicating whether information currently transmitted through the NR-PBCH in the NR SS block is the same. When the information is the same, a receiving end may combine the receptions of the information transmitted through the NR-PBCH.

(4) The information carried in the NR-PBCH to-be-transmitted signal in the NR SS block may be encoded information, e.g., a bit sequence outputted after the time index information of the SS block, a high-order bit of the time index information of the SS block, the TRP identification information, the combination indication information, or the like has been encoded (through parity check encoding, CRC encoding, polar encoding, tail-biting convolutional encoding, repetition encoding, bit filling, or the like).

(5) The information carried in the NR-PBCH to-be-transmitted signal in the NR SS block may be used to transmit a partial System Frame Number (SFB) or an extended SFN.

(6) The information carried in the NR-PBCH to-be-transmitted signal in the NR SS block may be used to transmit an extended cell ID for ultra-dense networking or a massive Machine Type Communication (mMTC) scenario.

(7) The information carried in the NR-PBCH to-be-transmitted signal in the NR SS block may be used to transmit time-frequency position information of a common search space.

(8) The information carried in the NR-PBCH to-be-transmitted signal in the NR SS block may be used to transmit idle reservation information for forward compatibility.

(9) The information carried in the NR-PBCH to-be-transmitted signal in the NR SS block may be used to transmit system bandwidth information.

(10) The information carried in the NR-PBCH to-be-transmitted signal in the NR SS block may be used to transmit period indication information of an NR-SS burst set.

(11) The information carried in the NR-PBCH to-be-transmitted signal in the NR SS block may be used to transmit measurement period information or measurement duration information.

(12) The information carried in the NR-PBCH to-be-transmitted signal in the NR SS block may be used to transmit a PHICH.

(13) The information carried in the NR-PBCH to-be-transmitted signal in the NR SS block may be used to transmit antenna configuration information of a g-NB.

(14) The information carried in the NR-PBCH to-be-transmitted signal in the NR SS block may be used to transmit non-standalone/standalone (NSA/SA) indication information.

(15) The information carried in the NR-PBCH to-be-transmitted signal in the NR SS block may be used to transmit a combination of the above information in conjunction with or not in conjunction with CRC mask.

In the embodiments of the present disclosure, a phase rotation value set may include different phase rotation values, and the different phase rotation values may correspond to the to-be-transmitted bit information in another way.

It should be appreciated that, in FIGS. 3 and 4, a to-be-transmitted signal may be the first to-be-transmitted signal, and a to-be-transmitted signal with the phase rotation may be the second to-be-transmitted signal.

According to the information transmission method and the information reception method in the embodiments of the present disclosure, the information may be transmitted in accordance with the phase difference between the to-be-transmitted signals mapped to the SS block, so as to reduce the quantity of information bits carried by an NR-PBCH resource, reduce a code rate of minimum system information, and improve the transmission performance of the partial minimum system information for the NR-PBCH. In addition, the UE may directly perform the channel estimation through the received first transmission signal and the second transmission signal to acquire the to-be-checked target information without any additional decoding process of the UE, so as to reduce the complexity in processing the information at the UE as well as the complexity in combining the receptions of the information through the NR-PBCH, simplify a reception algorithm and improve the reception performance.

The present disclosure further provides in some embodiments a network side device 500 which, as shown in FIG. 5, includes a mapping module 501 and a transmission module 502. The mapping module 501 is configured to map a first to-be-transmitted signal and a second to-be-transmitted signal to a first OFDM symbol and a second OFDM symbol in an SS block respectively, and a phase difference between the first to-be-transmitted signal and the second to-be-transmitted signal may indicate target information. The transmission module 502 is configured to transmit the first to-be-transmitted signal, the second to-be-transmitted signal and parity information for checking the target information through the SS block, and the parity information may be carried by a PBCH.

In a possible embodiment of the present disclosure, the first to-be-transmitted signal and the second to-be-transmitted signal may each be a reference signal or data.

In a possible embodiment of the present disclosure, when the first to-be-transmitted signal and the second to-be-transmitted signal are each a reference signal, the first OFDM symbol and the second OFDM symbol may each be a symbol for transmitting the PBCH.

In a possible embodiment of the present disclosure, the parity information may be CRC information.

In a possible embodiment of the present disclosure, the parity information may be information acquired through encoding first concatenate information. The first concatenate information may be information acquired through concatenating combination information and first parity information corresponding to the combination information. The combination information may be information acquired through combining partial minimum system information and the target information.

In a possible embodiment of the present disclosure, the parity information may be information acquired through encoding second concatenate information. The second concatenate information may be information acquired through concatenating the partial minimum system information and the first parity information corresponding to the combination information. The combination information may be information acquired through combining the partial minimum system information and the target information.

In a possible embodiment of the present disclosure, the parity information may be information acquired through encoding third concatenate information. The third concatenate information may be information acquired through concatenating the partial minimum system information and second parity information corresponding to the partial minimum system information. The second parity information may be information acquired through scrambling third parity information corresponding to the partial minimum system information by using a scrambling sequence corresponding to the target information.

In a possible embodiment of the present disclosure, the target information may include at least one of: time index information of the SS block, time index information of a portion of the SS block, transmission reception point identification information, a PBCH combination indication signal, a system frame number, an extended system frame number, an extended cell identity (ID), time-frequency position information of a common search space, idle reservation information, system bandwidth information, period indication information of an SS burst set, a transmission measurement period, a transmission measurement duration, a Physical Hybrid Automatic Repeat Request Indication Channel (PHICH), antenna configuration information, and non-standalone/standalone (NSA/SA) indication information.

The network side device 500 is capable of implementing the information transmission method in FIG. 1 and thus will not be particularly defined herein.

According to the network side device in the embodiments of the present disclosure, the first to-be-transmitted signal and the second to-be-transmitted signal may be mapped to the first OFDM symbol and the second OFDM symbol in the SS block, and the phase difference between the first to-be-transmitted signal and the second to-be-transmitted signal may represent the target information. Then, the first to-be-transmitted signal, the second to-be-transmitted signal and the parity information for checking the target information may be transmitted through the SS block, and the parity information may be carried by the PBCH. As a result, it is able for the UE to directly perform the channel estimation through the received first transmission signal and second transmission signal to acquire the target information without any additional decoding process of the UE, thereby to reduce the complexity in processing the information at the UE. In addition, the UE may further check the target information in accordance with the received parity information, so it is able to improve the reliability of the target information acquired by the UE.

Figure 6:
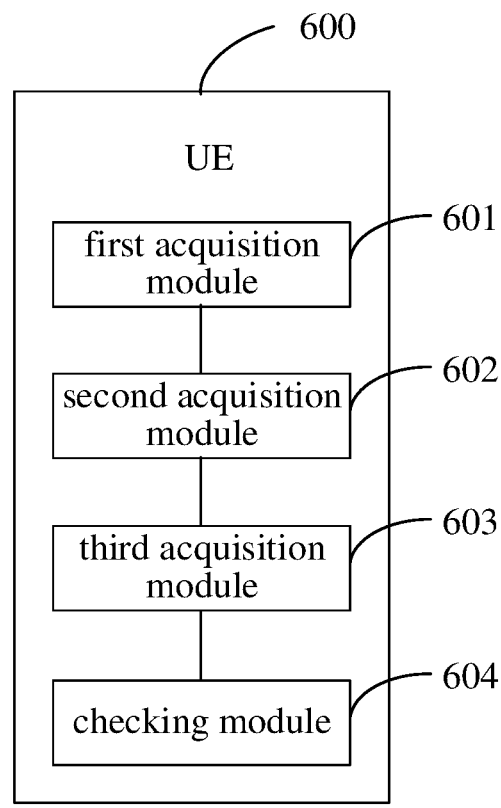
FIG. 6 is a schematic view showing a UE according to an embodiment of the present disclosure.

The present disclosure further provides in some embodiments a UE 600 which, as shown in FIG. 6, includes a first acquisition module 601, a second acquisition module 602, a third acquisition module 603 and a checking module 604. The first acquisition module 601 is configured to perform reception detection on an SS block, so as to acquire a first transmission signal mapped to a first OFDM symbol, a second transmission signal mapped to a second OFDM symbol, and parity information carried by a PBCH. The second acquisition module 602 is configured to perform channel estimation on the first transmission signal and the second transmission signal, so as to acquire a phase difference between the first transmission signal and the second transmission signal. The third acquisition module 603 is configured to acquire to-be-checked target information in accordance with the phase difference. The checking module 604 is configured to check the to-be-checked target information in accordance with the parity information.

In a possible embodiment of the present disclosure, the first transmission signal and the second transmission signal may each be a reference signal or data.

In a possible embodiment of the present disclosure, the first OFDM symbol and the second OFDM symbol may each be a symbol for transmitting the PBCH.

In a possible embodiment of the present disclosure, the parity information may be CRC information.

In a possible embodiment of the present disclosure, the parity information may be information acquired through encoding first concatenate information. The first concatenate information may be information acquired through concatenating combination information and first parity information corresponding to the combination information. The combination information may be information acquired through combining partial minimum system information and the target information.

Figure 7:
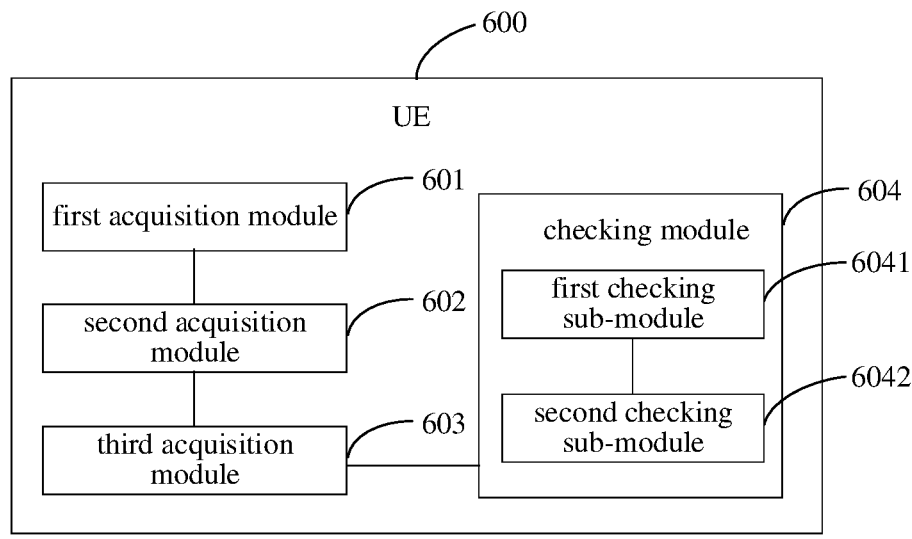
FIG. 7 is a schematic view showing another UE according to an embodiment of the present disclosure.

As shown in FIG. 7, the checking module 604 may include: a first checking sub-module 6041 configured to check the first concatenate information; and a second checking sub-module 6042 configured to, when a checking result is positive, check the to-be-checked target information in accordance with the target information in the combination information.

In a possible embodiment of the present disclosure, the parity information may be information acquired through encoding second concatenate information. The second concatenate information may be information acquired through concatenating the partial minimum system information and the first parity information corresponding to the combination information. The combination information may be information acquired through combining the partial minimum system information and the target information.

Figure 8:
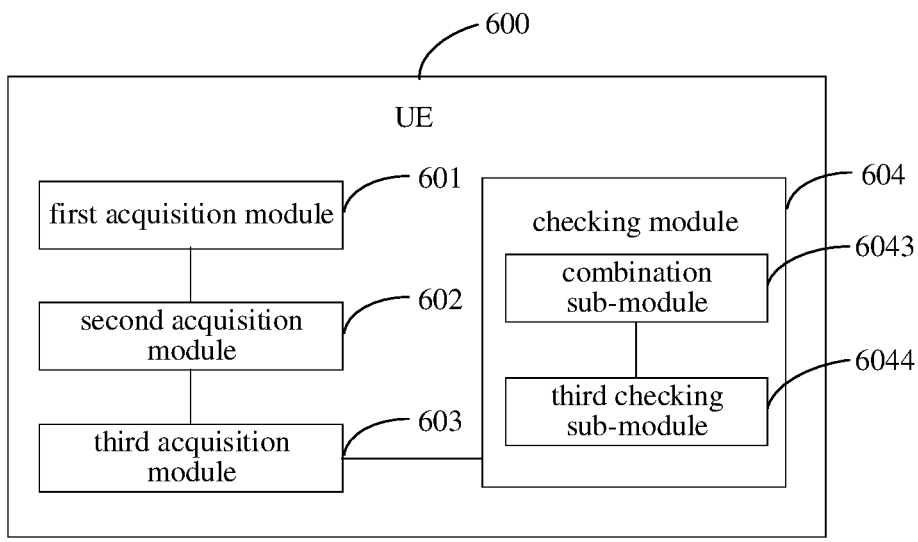
FIG. 8 is a schematic view showing yet another UE according to an embodiment of the present disclosure.

As shown in FIG. 8, the checking module 604 may include: a combination sub-module 6043 configured to combine the second concatenate information and the to-be-checked target information; and a third checking sub-module 6044 configured to check the combined information.

In a possible embodiment of the present disclosure, the parity information may be information acquired through encoding third concatenate information. The third concatenate information may be information acquired through concatenating the partial minimum system information and second parity information corresponding to the partial minimum system information. The second parity information may be information acquired through scrambling third parity information corresponding to the partial minimum system information by using a scrambling sequence corresponding to the target information.

Figure 9:
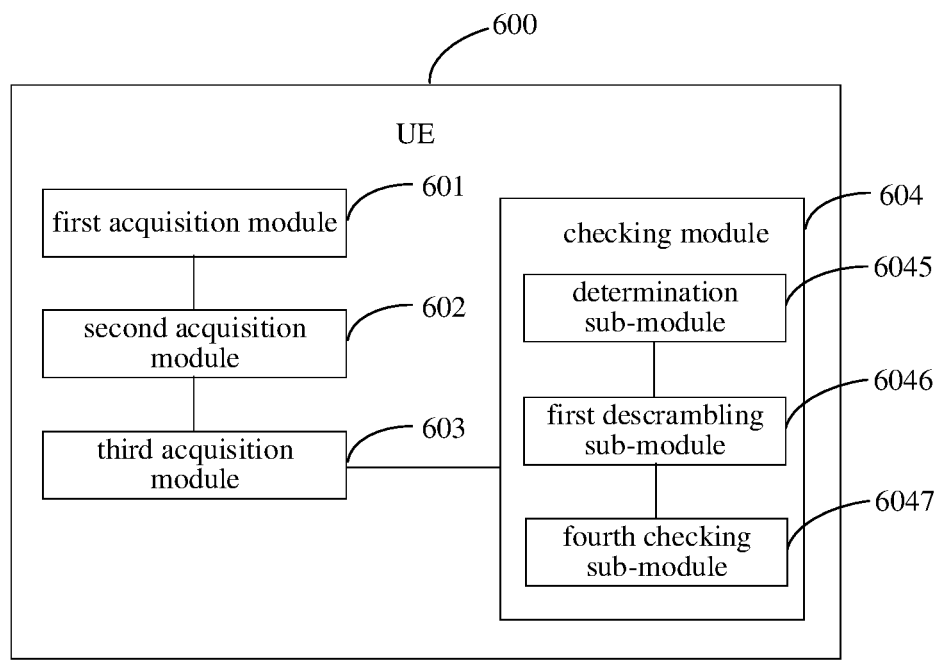
FIG. 9 is a schematic view showing still yet another UE according to an embodiment of the present disclosure.

As shown in FIG. 9, the checking module 604 may include: a determination sub-module 6045 configured to determine the scrambling sequence corresponding to the to-be-checked target information; a first descrambling sub-module 6046 configured to descramble the third parity information in the third concatenate information by using the scrambling sequence corresponding to the to-be-checked target information; and a fourth checking sub-module 6047 configured to check the descrambled third concatenate information.

In a possible embodiment of the present disclosure, the parity information may be information acquired through encoding third concatenate information. The third concatenate information may be information acquired through concatenating the partial minimum system information and second parity information corresponding to the partial minimum system information. The second parity information may be information acquired through scrambling third parity information corresponding to the partial minimum system information by using a scrambling sequence corresponding to the target information.

Figure 10:
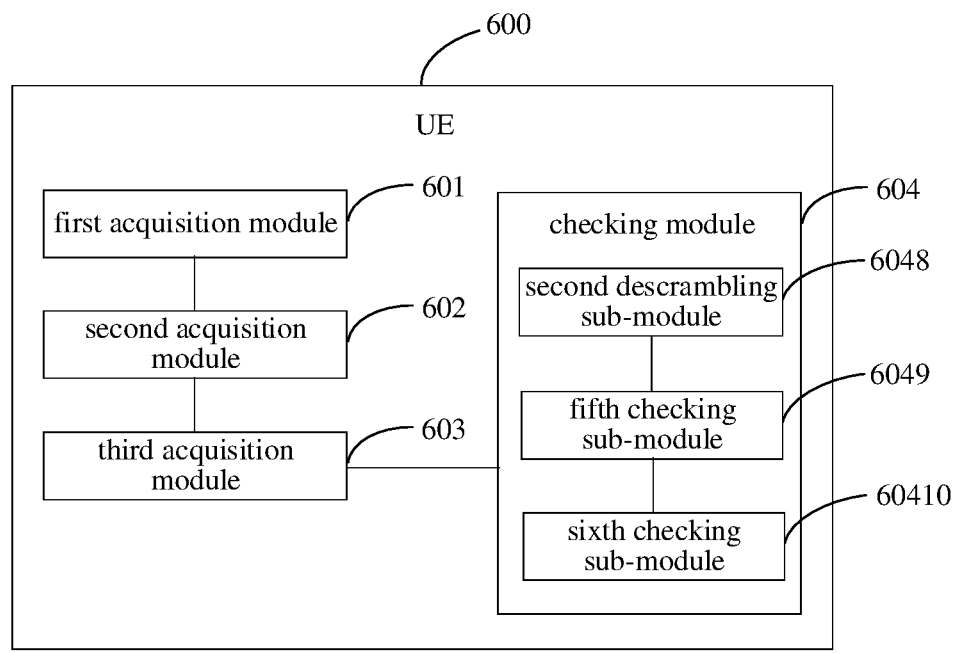
FIG. 10 is a schematic view showing still yet another UE according to an embodiment of the present disclosure.

As shown in FIG. 10, the checking module 604 may include: a second descrambling sub-module 6048 configured to descramble the third parity information in the third concatenate information by using the scrambling sequence; a fifth checking sub-module 6049 configured to check the descrambled third concatenate information; and a sixth checking sub-module 60410 configured to check the to-be-checked target information in accordance with the target information corresponding to the scrambling sequence used when a checking result is positive.

In a possible embodiment of the present disclosure, the target information may include at least one of: time index information of the SS block, time index information of a portion of the SS block, transmission reception point identification information, a PBCH combination indication signal, a system frame number, an extended system frame number, an extended cell ID, time-frequency position information of a common search space, idle reservation information, system bandwidth information, period indication information of an SS burst set, a transmission measurement period, a transmission measurement duration, a PHICH, antenna configuration information, and NSA/SA indication information.

The UE 600 is capable of implementing the information transmission method in FIG. 2 and thus will not be particularly defined herein.

According to the embodiments of the present disclosure, the UE may perform reception detection on the SS block to acquire the first transmission signal mapped to the first OFDM symbol, the second transmission signal mapped to the second OFDM symbol and the parity information carried by the PBCH. Next, the UE may perform channel estimation on the first transmission signal and the second transmission signal to acquire the phase difference between the first transmission signal and the second transmission signal. Then, the UE may acquire the to-be-checked target information in accordance with the phase difference, and check the to-be-checked target information in accordance with the parity information. As a result, it is able for the UE to directly perform the channel estimation through the received first transmission signal and second transmission signal to acquire the to-be-checked target information without any additional decoding process of the UE, thereby to reduce the complexity in processing the information at the UE. In addition, the UE may further check the to-be-checked target information in accordance with the received parity information, so as to improve the reliability of the to-be-checked target information.

The present disclosure further provides in some embodiments a network side device, including a processor, a memory, and an information transmission program stored in the memory and capable of being executed by the processor. The processor is configured to execute the information transmission program so as to implement the above-mentioned information transmission method with a same technical effect, which will not be particularly defined herein.

The present disclosure further provides in some embodiments a UE, including a processor, a memory, and an information reception program stored in the memory and capable of being executed by the processor. The processor is configured to execute the information reception program so as to implement the above-mentioned information transmission and reception methods with a same technical effect, which will not be particularly defined herein.

The present disclosure further provides in some embodiments a computer-readable storage medium storing therein a computer program. The computer program is capable of being executed by a processor so as to implement the above-mentioned information transmission method with a same technical effect, which will not be particularly defined herein. The computer-readable storage medium may be a Read-Only Memory (ROM), a Random Access Memory (RAM), a magnetic disc, an optical disc, or the like.

The present disclosure further provides in some embodiments a computer-readable storage medium storing therein a computer program. The computer program is capable of being executed by a processor so as to implement the above-mentioned information reception method with a same technical effect, which will not be particularly defined herein. The computer-readable storage medium may be a ROM, a RAM, a magnetic disc, an optical disc, or the like.

Figure 11:
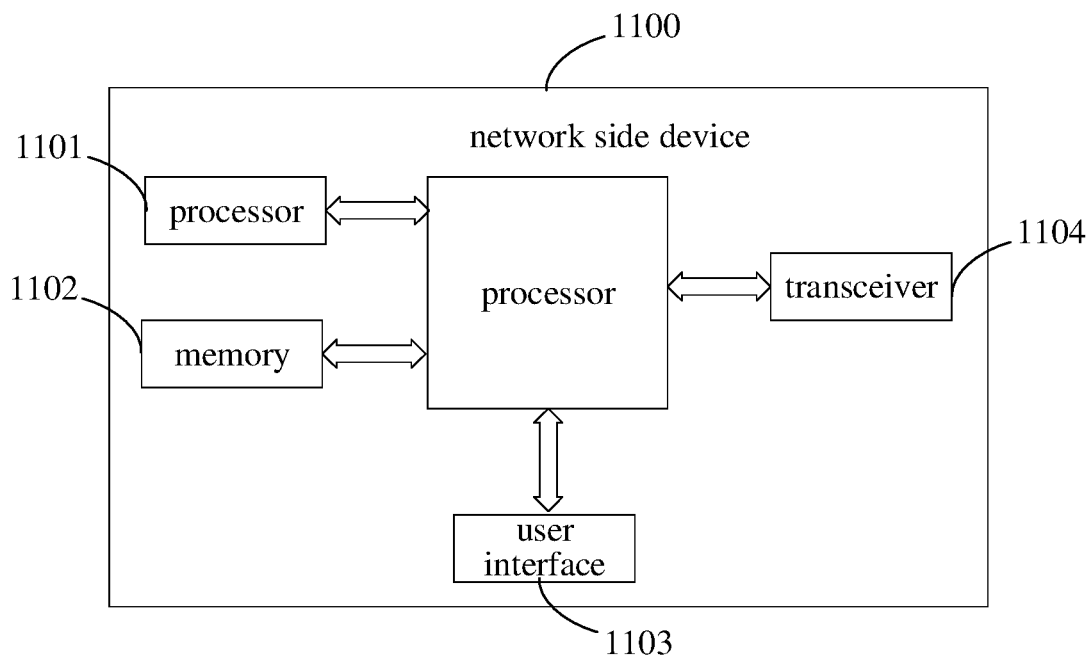
FIG. 11 is a schematic view showing yet another network side device according to an embodiment of the present disclosure.

As shown in FIG. 11 being a schematic view showing yet another network side device according to an embodiment of the present disclosure, a network side device 1100 includes a processor 1101, a memory 1102, a user interface 1103, a transceiver 1104 and a bus interface.

In the embodiments of the present disclosure, the network side device 1100 may further include an information transmission program stored in the memory 1102 and executed by the processor 1101. The processor 1101 is configured to execute the information transmission program, so as to: map a first to-be-transmitted signal and a second to-be-transmitted signal to a first OFDM symbol and a second OFDM symbol in an SS block respectively, a phase difference between the first to-be-transmitted signal and the second to-be-transmitted signal indicating target information; and transmit the first to-be-transmitted signal, the second to-be-transmitted signal and parity information for checking the target information through the SS block, the parity information being carried by a PBCH.

In FIG. 11, bus architecture may include a number of buses and bridges connected to each other, so as to connect various circuits for one or more processors such as a processor 1101 and one or more memories such as a memory 1102. In addition, the bus architecture may be used to connect any other circuits, such as a circuit for a peripheral device, a circuit for a voltage stabilizer and a power management circuit, which is known in the art and thus will not be further defined herein. The bus interface may be provided, and the transceiver 1104 may consist of a plurality of elements, i.e., a transmitter and a receiver for communication with various other devices over a transmission medium. With respect to different UEs, the user interface 1103 may also be provided for devices which are to be arranged inside or outside the UE, and these devices may include but not limited to a keypad, a display, a speaker, a microphone and a joystick. The processor 1101 may take charge of managing the bus architecture as well as general processings. The memory 1102 may store therein data for the operation of the processor 1101.

In a possible embodiment of the present disclosure, the first to-be-transmitted signal and the second to-be-transmitted signal may each be a reference signal or data.

In a possible embodiment of the present disclosure, the first OFDM symbol and the second OFDM symbol may each be a symbol for transmitting the PBCH.

In a possible embodiment of the present disclosure, the parity information may be CRC information.

In a possible embodiment of the present disclosure, the parity information may be information acquired through encoding first concatenate information. The first concatenate information may be information acquired through concatenating combination information and first parity information corresponding to the combination information. The combination information may be information acquired through combining partial minimum system information and the target information.

In a possible embodiment of the present disclosure, the parity information may be information acquired through encoding second concatenate information. The second concatenate information may be information acquired through concatenating the partial minimum system information and the first parity information corresponding to the combination information. The combination information may be information acquired through combining the partial minimum system information and the target information.

In a possible embodiment of the present disclosure, the parity information may be information acquired through encoding third concatenate information. The third concatenate information may be information acquired through concatenating the partial minimum system information and second parity information corresponding to the partial minimum system information. The second parity information may be information acquired through scrambling third parity information corresponding to the partial minimum system information by using a scrambling sequence corresponding to the target information.

In a possible embodiment of the present disclosure, the target information may include at least one of: time index information of the SS block, time index information of a portion of the SS block, transmission reception point identification information, a PBCH combination indication signal, a system frame number, an extended system frame number, an extended cell ID, time-frequency position information of a common search space, idle reservation information, system bandwidth information, period indication information of an SS burst set, a transmission measurement period, a transmission measurement duration, a PHICH, antenna configuration information, and NSA/SA indication information.

The network side device 1100 is capable of implementing the information transmission method and thus will not be particularly defined herein.

According to the network side device in the embodiments of the present disclosure, the first to-be-transmitted signal and the second to-be-transmitted signal may be mapped to the first OFDM symbol and the second OFDM symbol respectively in the SS block, and the phase difference between the first to-be-transmitted signal and the second to-be-transmitted signal may represent the target information. Then, the first to-be-transmitted signal, the second to-be-transmitted signal and the parity information for checking the target information may be transmitted through the SS block, and the parity information may be carried by the PBCH. As a result, it is able for the UE to directly perform the channel estimation through the received first transmission signal and second transmission signal to acquire the target information without any additional decoding process of the UE, thereby to reduce the complexity in processing the information at the UE. In addition, the UE may further check the acquired target information in accordance with the received parity information, so it is able to improve the reliability of the target information acquired by the UE.

Figure 12:
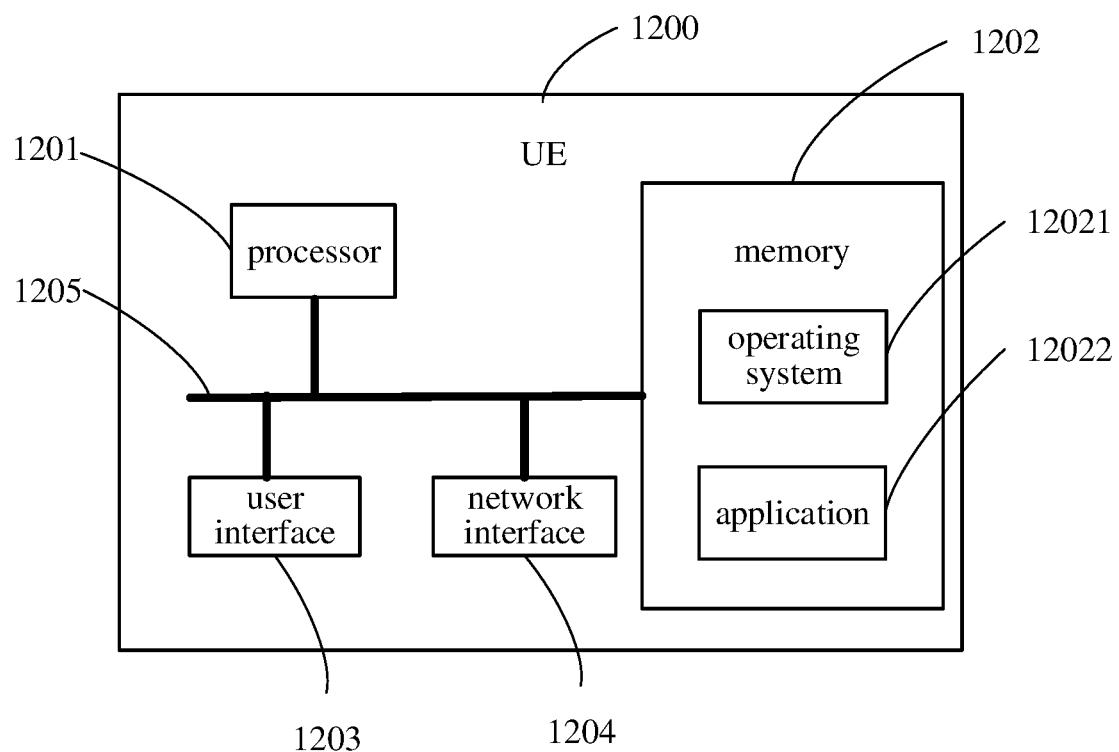
FIG. 12 is a schematic view showing still yet another UE according to an embodiment of the present disclosure.

As shown in FIG. 12 being a schematic view showing still yet another UE according to an embodiment of the present disclosure, a UE 1200 includes at least one processor 1201, a memory 1202, at least one network interface 1204 and a user interface 1203. The components of the UE 1200 may be coupled together through a bus system 1205. It should be appreciated that, the bus system 1205 is configured to achieve connection and communication among the components. Apart from a data bus, the bus system 1205 may further include a power source bus, a control bus and a state signal bus. For clarification, all these buses in FIG. 12 may be collectively called as bus system 1205.

The user interface 1203 may further include a display, a keyboard or a pointing device (e.g., a mouse, a track ball, a touch pad or a touch panel).

It should be appreciated that, in the embodiments of the present disclosure, the memory 1202 may be a volatile memory, a nonvolatile memory or both. The nonvolatile memory may be a ROM, a Programmable ROM (PROM), an Erasable PROM (EPROM), an electrically EPROM (EEPROM) or a flash memory. The volatile memory may be a RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 1202 intends to include, but not limited to, the above-mentioned and any other appropriate memories.

In some embodiments of the present disclosure, the following elements may be stored in the memory 1202: an executable module or data structure, a subset or an extended set thereof, an operating system 12021 and an application 12022.

The operating system 12021 may include various system programs, e.g., a framework layer, a core library layer and a driving layer, so as to implement various basic services and process hardware-based tasks. The application 12022 may include various applications, e.g., a Media Player and a Browser, so as to implement various application services. The programs for implementing the above-mentioned method may be included in the application 12022.

In the embodiments of the present disclosure, the UE 1200 may further include an information reception program stored in the memory 1202 and executed by the processor 1201. The processor 1201 is configured to execute the information reception program, so as to: perform reception detection on an SS block, so as to acquire a first transmission signal mapped to a first OFDM symbol, a second transmission signal mapped to a second OFDM symbol, and parity information carried by a PBCH; perform channel estimation on the first transmission signal and the second transmission signal, so as to acquire a phase difference between the first transmission signal and the second transmission signal; acquire to-be-checked target information in accordance with the phase difference; and check the to-be-checked target information in accordance with the parity information.

The above-mentioned method may be applied to, or implemented by, the processor 1201. The processor 1201 may be an integrated circuit (IC) having a signal processing capability. During the implementation, the steps of the above-mentioned method may be completed through an integrated logic circuit of hardware in the processor 1201 or instructions in the form of software. The processor 1201 may be a general-purpose processor, a digital signal processor, an Application-Specific Integrated Circuit (ASIC), a Field Programmable Gate Array (FPGA) or another programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the decoding processor in the form of hardware, or a combination of hardware and software modules in the decoding processor. The software module may be located in a known computer readable storage medium such as an RAM, a flash memory, an ROM, a PROM, an EEPROM, or a register. The computer readable storage medium may be located in the memory 1202, and the processor 1201 may read information stored in the memory 1202 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a Digital Signal processor (DSP), a DSP device (DSPD), a Programmable Logic Device (PLD), an FPGA, a general-purpose processor, a controller, a microcontroller, a microprocessor, another electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and capable of being executed by the processor. The memory may be implemented inside or outside the processor.

In a possible embodiment of the present disclosure, the first transmission signal and the second transmission signal may each be a reference signal or data.

In a possible embodiment of the present disclosure, the first OFDM symbol and the second OFDM symbol may each be a symbol for transmitting the PBCH.

In a possible embodiment of the present disclosure, the parity information may be CRC information.

In a possible embodiment of the present disclosure, the parity information may be information acquired through encoding first concatenate information. The first concatenate information may be information acquired through concatenating combination information and first parity information corresponding to the combination information. The combination information may be information acquired through combining partial minimum system information and the target information. The processor 1201 configured to execute the information reception program to check the to-be-checked target information through the parity information is further configured to: check the first concatenate information; and when a checking result is positive, check the to-be-checked target information in accordance with the target information in the combination information.

In a possible embodiment of the present disclosure, the parity information may be information acquired through encoding second concatenate information. The second concatenate information may be information acquired through concatenating the partial minimum system information and the first parity information corresponding to the combination information. The combination information may be information acquired through combining the partial minimum system information and the target information. The processor 1201 configured to execute the information reception program to check the to-be-checked target information through the parity information is further configured to: combine the second concatenate information and the to-be-checked target information; and check the combined information.

In a possible embodiment of the present disclosure, the parity information may be information acquired through encoding third concatenate information. The third concatenate information may be information acquired through concatenating the partial minimum system information and second parity information corresponding to the partial minimum system information. The second parity information may be information acquired through scrambling third parity information corresponding to the partial minimum system information by using a scrambling sequence corresponding to the target information. The processor 1201 configured to execute the information reception program to check the to-be-checked target information through the parity information is further configured to: determine the scrambling sequence corresponding to the to-be-checked target information; descramble the third parity information in the third concatenate information by using the scrambling sequence corresponding to the to-be-checked target information; and check the descrambled third concatenate information.

In a possible embodiment of the present disclosure, the parity information may be information acquired through encoding third concatenate information. The third concatenate information may be information acquired through concatenating the partial minimum system information and second parity information corresponding to the partial minimum system information. The second parity information may be information acquired through scrambling third parity information corresponding to the partial minimum system information by using a scrambling sequence corresponding to the target information. The processor 1201 configured to execute the information reception program to check the to-be-checked target information through the parity information is further configured to: descramble the third parity information in the third concatenate information by using the scrambling sequence; check the descrambled third concatenate information; and check the to-be-checked target information in accordance with the target information corresponding to the scrambling sequence used when a checking result is positive.

In a possible embodiment of the present disclosure, the target information may include at least one of: time index information of the SS block, time index information of a portion of the SS block, transmission reception point identification information, a PBCH combination indication signal, a system frame number, an extended system frame number, an extended cell ID, time-frequency position information of a common search space, idle reservation information, system bandwidth information, period indication information of an SS burst set, a transmission measurement period, a transmission measurement duration, a PHICH, antenna configuration information, and NSA/SA indication information.

The UE 1200 is capable of implementing the information transmission method and thus will not be particularly defined herein.

According to the embodiments of the present disclosure, the UE may perform reception detection on the SS block to acquire the first transmission signal mapped to the first OFDM symbol, the second transmission signal mapped to the second OFDM symbol and the parity information carried by the PBCH. Next, the UE may perform channel estimation on the first transmission signal and the second transmission signal to acquire the phase difference between the first transmission signal and the second transmission signal. Then, the UE may acquire the to-be-checked target information in accordance with the phase difference, and check the to-be-checked target information in accordance with the parity information. As a result, it is able for the UE to directly perform the channel estimation through the received first transmission signal and second transmission signal to acquire the to-be-checked target information without any additional decoding process of the UE, thereby to reduce the complexity in processing the information at the UE. In addition, the UE may further check the to-be-checked target information in accordance with the received parity information, so as to improve the reliability of the to-be-checked target information.

It should be appreciated that, units and steps described in the embodiments of the present disclosure may be implemented in the form of electronic hardware, or a combination of a computer software and the electronic hardware. Whether or not these functions are executed by hardware or software depends on specific applications or design constraints of the technical solution. Different methods may be adopted by a person skilled in the art with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the devices are merely for illustrative purposes, and the units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the prior art, may appear in the form of software products, which may be stored in a storage medium and include several instructions so as to enable a computer equipment (e.g., a personal computer, a server or network equipment) to execute all or parts of the steps of the method according to the embodiments of the present disclosure. The storage medium includes a medium capable of storing therein program codes, e.g., a Universal Serial Bus (USB) flash disk, a mobile Hard Disk (HD), a ROM, a RAM, a magnetic disk or an optical disk.

The above embodiments are for illustrative purposes only, but the present disclosure is not limited thereto. Any person skilled in the art may make further modifications and improvements without departing from the principle of the present disclosure, and these modifications and improvements shall also fall within the scope of the present disclosure. A protection scope of the present disclosure is defined by claims.

What is claimed is:
1. An information transmission method for a network side device in a New Radio (NR) system, comprising:
  mapping a Physical Broadcast Channel (PBCH) reference signal to a symbol of a Synchronization Signal (SS) block through which a PBCH is to be transmitted, target information being transmitted through a sequence of the PBCH reference signal; and transmitting the PBCH reference signal and parity information through the SS block, the parity information being configured to check the target information, and the parity information being carried by the PBCH, wherein the target information consists of only one high-order bit of the time index information of the SS block, wherein the parity information is information acquired through encoding first concatenate information; the first concatenate information is information acquired through concatenating combination information and first parity information corresponding to the combination information; and the combination information is information acquired through combining partial minimum system information of the NR system and the target information, the first parity information comprises Cyclic Redundancy Check (CRC) information, parity check information, or Hamming code check information; or the parity information is information acquired through encoding second concatenate information; the second concatenate information is information acquired through concatenating partial minimum system information of the NR system and first parity information corresponding to combination information; and the combination information is information acquired through combining the partial minimum system information of the NR system and the target information, and the first parity information comprises CRC information, parity check information, or Hamming code check information; or the parity information is information acquired through encoding third concatenate information; the third concatenate information is information acquired through concatenating partial minimum system information of the NR system and second parity information corresponding to the partial minimum system information of the NR system; and the second parity information is information acquired through scrambling third parity information corresponding to the partial minimum system information of the NR system by using a scrambling sequence corresponding to the target information, and the third parity information comprises CRC information, parity check information, or Hamming code check information.

2. The information transmission method according to claim 1, wherein the parity information is Cyclic Redundancy Check (CRC) information.

3. An information reception method for a User Equipment (UE) in a NR system, comprising:

performing reception detection on an SS block, to acquire a first transmission signal mapped to a first Orthogonal Frequency Division Multiplexing (OFDM) symbol, a second transmission signal mapped to a second OFDM symbol, and parity information carried by a PBCH;

performing channel estimation on the first transmission signal and the second transmission signal, to acquire a phase difference between the first transmission signal and the second transmission signal;

acquiring to-be-checked target information in accordance with the phase difference; and checking the to-be-checked target information in accordance with the parity information, wherein the target information consists of only one high-order bit of the time index information of the SS block, wherein the parity information is information acquired through encoding first concatenate information; the first concatenate information is information acquired through concatenating combination information and first parity information corresponding to the combination information; and the combination information is information acquired through combining partial minimum system information of the NR system and the target information, the first parity information comprises CRC information, parity check information, or Hamming code check information; or the parity information is information acquired through encoding second concatenate information; the second concatenate information is information acquired through concatenating partial minimum system information of the NR system and first parity information corresponding to combination information; and the combination information is information acquired through combining the partial minimum system information of the NR system and the target information, and the first parity information comprises CRC information, parity check information, or Hamming code check information; or the parity information is information acquired through encoding third concatenate information; the third concatenate information is information acquired through concatenating partial minimum system information of the NR system and second parity information corresponding to the partial minimum system information of the NR system; and the second parity information is information acquired through scrambling third parity information corresponding to the partial minimum system information of the NR system by using a scrambling sequence corresponding to the target information, and the third parity information comprises CRC information, parity check information, or Hamming code check information.

4. The information reception method according to claim 3, wherein the first transmission signal and the second transmission signal are each a reference signal or data.

5. The information reception method according to claim 4, wherein the first OFDM symbol and the second OFDM symbol are each a symbol for transmitting the PBCH.

6. The information reception method according to claim 3, wherein the parity information is CRC information.

7. The information reception method according to claim 3, wherein the parity information is the information acquired through encoding the first concatenate information; the first concatenate information is the information acquired through concatenating the combination information and the first parity information corresponding to the combination information; the combination information is the information acquired through combining the partial minimum system information of the NR system and the target information; and the target information is information acquired by a network side device in accordance with a first to-be-transmitted signal and a second to-be-transmitted signal mapped to a first OFDM symbol and a second OFDM symbol respectively, wherein the checking the to-be-checked target information in accordance with the parity information comprises:

checking the first concatenate information; and when a checking result of the first concatenate information is positive, checking the to-be-checked target information in accordance with the target information in the combination information.

8. The information reception method according to claim 3, wherein the parity information is the information acquired through encoding the second concatenate information; the second concatenate information is the information acquired through concatenating the partial minimum system information of the NR system and the first parity information corresponding to the combination information; the combination information is the information acquired through combining the partial minimum system information of the NR system and the target information; and the target information is information acquired by a network side device in accordance with a first to-be-transmitted signal and a second to-be-transmitted signal mapped to a first OFDM symbol and a second OFDM symbol respectively, wherein the checking the to-be-checked target information in accordance with the parity information comprises:

combining the second concatenate information and the to-be-checked target information; and checking the combined information.

9. The information reception method according to claim 3, wherein the parity information is the information acquired through encoding third concatenate information; the third concatenate information is the information acquired through concatenating the partial minimum system information of the NR system and the second parity information corresponding to the partial minimum system information of the NR system; the second parity information is information acquired through scrambling the third parity information corresponding to the partial minimum system information of the NR system by using the scrambling sequence corresponding to the target information, and the target information is information acquired by a network side device in accordance with a first to-be-transmitted signal and a second to-be-transmitted signal mapped to a first OFDM symbol and a second OFDM symbol respectively, wherein the checking the to-be-checked target information in accordance with the parity information comprises:

determining the scrambling sequence corresponding to the to-be-checked target information;

descrambling the third parity information in the third concatenate information by using the scrambling sequence corresponding to the to-be-checked target information; and checking the descrambled third concatenate information.

10. The information reception method according to claim 3, wherein the parity information is information acquired through encoding third concatenate information; the third concatenate information is information acquired through concatenating partial minimum system information of the NR system and second parity information corresponding to the partial minimum system information of the NR system; the second parity information is information acquired through scrambling third parity information corresponding to the partial minimum system information of the NR system by using a scrambling sequence corresponding to the target information; and the target information is information acquired by a network side device in accordance with a first to-be-transmitted signal and a second to-be-transmitted signal mapped to a first OFDM symbol and a second OFDM symbol respectively, wherein the checking the to-be-checked target information in accordance with the parity information comprises:

descrambling the third parity information in the third concatenate information by using the scrambling sequence;

checking the descrambled third concatenate information; and checking the to-be-checked target information in accordance with the target information corresponding to the scrambling sequence used when a checking result of the descrambled third concatenate information is positive.

11. A network side device in a NR system, comprising a processor, a memory, and an information transmission program stored in the memory and capable of being executed by the processor, wherein the processor is configured to execute the information transmission program to implement the information transmission method according to:

map a PBCH reference signal to a symbol of a SS block through which a PBCH is to be transmitted, target information being transmitted through a sequence of the PBCH reference signal; and transmit the PBCH reference signal and parity information through the SS block, the parity information being configured to check the target information, and the parity information being carried by the PBCH, wherein the target information consists of only one high-order bit of the time index information of the SS block, wherein the parity information is information acquired through encoding first concatenate information; the first concatenate information is information acquired through concatenating combination information and first parity information corresponding to the combination information; and the combination information is information acquired through combining partial minimum system information of the NR system and the target information, and the first parity information comprises CRC information, parity check information, or Hamming code check information; or the parity information is information acquired through encoding second concatenate information; the second concatenate information is information acquired through concatenating partial minimum system information of the NR system and first parity information corresponding to combination information; and the combination information is information acquired through combining the partial minimum system information of the NR system and the target information, and the first parity information comprises CRC information, parity check information, or Hamming code check information; or the parity information is information acquired through encoding third concatenate information; the third concatenate information is information acquired through concatenating partial minimum system information of the NR system and second parity information corresponding to the partial minimum system information of the NR system; and the second parity information is information acquired through scrambling third parity information corresponding to the partial minimum system information of the NR system by using a scrambling sequence corresponding to the target information, and the third parity information comprises CRC information, parity check information, or Hamming code check information.

12. A UE, comprising a processor, a memory, and an information reception program stored in the memory and capable of being executed by the processor, wherein the processor is configured to execute the information reception program to implement the information reception method according to claim 3.

13. The network side device according to claim 11, wherein the parity information is CRC information.

14. The UE according to claim 12, wherein the first transmission signal and the second transmission signal are each a reference signal or data.

15. The UE according to claim 14, wherein the first OFDM symbol and the second OFDM symbol are each a symbol for transmitting the PBCH.

16. The UE according to claim 12, wherein the parity information is CRC information.

17. The UE according to claim 12, wherein the parity information is the information acquired through encoding the first concatenate information; the first concatenate information is the information acquired through concatenating the combination information and the first parity information corresponding to the combination information; the combination information is the information acquired through combining the partial minimum system information of the NR system and the target information; and the target information is information acquired by a network side device in accordance with a first to-be-transmitted signal and a second to-be-transmitted signal mapped to a first OFDM symbol and a second OFDM symbol respectively,
- wherein the checking the to-be-checked target information in accordance with the parity information comprises:
- checking the first concatenate information; and
- when a checking result of the first concatenate information is positive, checking the to-be-checked target information in accordance with the target information in the combination information.

* * * * *